(12) United States Patent
Matsuura et al.

(10) Patent No.: US 8,697,305 B2
(45) Date of Patent: Apr. 15, 2014

(54) FUEL CELL SYSTEM

(75) Inventors: Akio Matsuura, Kariya (JP); Toru Bisaka, Kariya (JP); Yusuke Shimoyana, Kariya (JP)

(73) Assignee: Kabushiki Kaisha Toyoda Jidoshokki, Aichi-ken (JP)

(*) Notice: Subject to any disclaimer, the term of this patent is extended or adjusted under 35 U.S.C. 154(b) by 477 days.

(21) Appl. No.: 12/723,470

(22) Filed: Mar. 12, 2010

(65) Prior Publication Data

US 2010/0279191 A1 Nov. 4, 2010

(30) Foreign Application Priority Data

| Mar. 16, 2009 | (JP) | ................... 2009-062645 |
| Mar. 16, 2009 | (JP) | ................... 2009-062646 |
| May 11, 2009 | (JP) | ................... 2009-114385 |
| May 11, 2009 | (JP) | ................... 2009-114386 |
| May 11, 2009 | (JP) | ................... 2009-114387 |
| Jan. 18, 2010 | (JP) | ................... 2010-008409 |

(51) Int. Cl.
*H01M 8/04* (2006.01)

(52) U.S. Cl.
USPC ......................... 429/443; 429/514

(58) Field of Classification Search
USPC .............. 429/507–516, 414, 443, 129–147, 429/247–255
See application file for complete search history.

(56) References Cited

U.S. PATENT DOCUMENTS

| 4,362,789 | A | 12/1982 | Dighe | |
| 4,978,479 | A | 12/1990 | Morini | |
| 6,338,472 | B1 * | 1/2002 | Shimazu et al. | ............. 261/78.2 |
| 6,936,369 | B1 | 8/2005 | Komura et al. | |
| 8,114,534 | B2 * | 2/2012 | Nakayama et al. | ............. 429/61 |
| 2002/0146607 | A1 | 10/2002 | Kai et al. | |
| 2004/0062975 | A1 | 4/2004 | Yamamoto et al. | |
| 2007/0264554 | A1 * | 11/2007 | Fujita et al. | ..................... 429/34 |
| 2007/0287054 | A1 * | 12/2007 | Ueda et al. | ..................... 429/34 |
| 2009/0236182 | A1 * | 9/2009 | Yamagami | .................... 187/222 |
| 2010/0221630 | A1 * | 9/2010 | Kajiwara et al. | ............. 429/443 |

FOREIGN PATENT DOCUMENTS

| JP | 53-18418 | * | 2/1978 | ............. F02M 19/06 |
| JP | 53-18418 U | | 2/1978 | |
| JP | 53-59028 | * | 5/1978 | ............. F02M 19/06 |
| JP | 53-59028 U | | 5/1978 | |
| JP | 56-8831 | * | 1/1981 | ............. F02M 19/06 |
| JP | 56-8831 U | | 1/1981 | |

(Continued)

OTHER PUBLICATIONS

Japanese Office Action issued in corresponding Japanese Patent Application No. 2009-062645, dated May 23, 2011.

*Primary Examiner* — Patrick Ryan
*Assistant Examiner* — Kiran Quraishi
(74) *Attorney, Agent, or Firm* — Sughrue Mion, PLLC

(57) ABSTRACT

A fuel cell system including a fuel cell, a gas-liquid separator, a tank, an outlet pipe, and an inlet pipe is disclosed. The gas-liquid separator separates off-gas discharged from the fuel cell into water and gas. The tank is capable of containing water separated by the gas-liquid separator. The outlet pipe discharges gas, which is separated by the gas-liquid separator, from the gas-liquid separator. The outlet pipe has a venturi. The inlet pipe draws the water contained in the tank into the venturi. The water contained in the tank is drawn through the inlet pipe into the venturi to be atomized and discharged as atomized water from the outlet pipe.

24 Claims, 20 Drawing Sheets

(56) References Cited

FOREIGN PATENT DOCUMENTS

| | | | | | |
|---|---|---|---|---|---|
| JP | 56-008831 | U | 1/1981 | | |
| JP | 3-73648 | * | 7/1991 | ............ | F02M 19/03 |
| JP | 3-73648 | U | 7/1991 | | |
| JP | 10-197077 | A | 7/1998 | | |
| JP | 11-162490 | A | 6/1999 | | |
| JP | 2001-351656 | A | 12/2001 | | |
| JP | 2002-313382 | A | 10/2002 | | |
| JP | 2003-002604 | A | 1/2003 | | |
| JP | 2004-095528 | * | 3/2004 | ............ | H01M 8/00 |
| JP | 2004095528 | A * | 3/2004 | ............ | H01M 8/04 |
| JP | 2004-127666 | A | 4/2004 | | |
| JP | 2004127666 | A * | 4/2004 | ............ | H01M 8/04 |
| JP | 2005-251576 | A | 9/2005 | | |
| JP | 2006-032134 | A | 2/2006 | | |
| JP | 2006032134 | A * | 2/2006 | ............ | H01M 8/04 |
| JP | 2006-100101 | A | 4/2006 | | |
| JP | 2007-141475 | A | 6/2007 | | |
| JP | 2007141475 | A * | 6/2007 | ............ | H01M 8/04 |
| JP | 2007-242280 | A | 9/2007 | | |
| JP | 2007-280696 | A | 10/2007 | | |
| JP | 2008-130392 | A | 6/2008 | | |
| JP | 2008-166229 | A | 7/2008 | | |
| JP | 2008-235203 | A | 10/2008 | | |
| JP | 2008-269844 | A | 11/2008 | | |
| JP | 2008269844 | A * | 11/2008 | ............ | H01M 8/04 |
| JP | 2009-026498 | A | 2/2009 | | |
| WO | WO 2009/044656 | * | 4/2009 | ............ | H01M 8/04 |

* cited by examiner

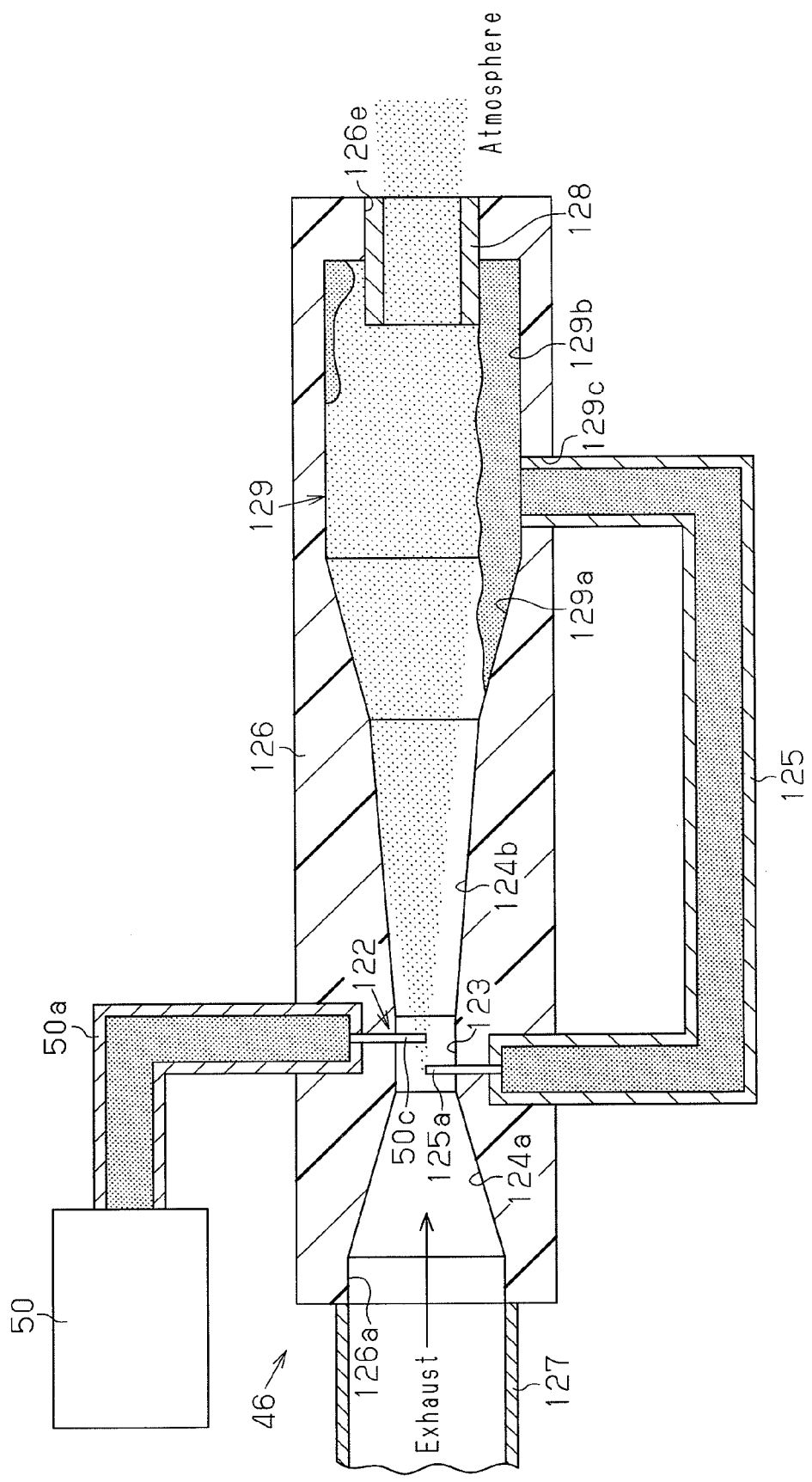

FUEL CELL SYSTEM

BACKGROUND OF THE INVENTION

The present invention relates to a fuel cell system.

In recent years, electric vehicles and so-called hybrid vehicles have come into practical use. Electric vehicles use electricity as a drive power source to avoid contributing to global warming caused by exhaust. Hybrid vehicles use a motor to drive the drive wheels when starting the vehicle or in low speed ranges and uses an engine (combustion engine) to drive the drive wheels at middle and high speed ranges to lower fuel consumption and reduce exhaust. Electric vehicles that use fuel cells in lieu of batteries as a power source (fuel cell vehicles) have also come into practical use. Fuel cell systems installed in fuel cell vehicles generate electromotive power by supplying hydrogen and air (oxygen) to the fuel cells and causing an electrochemical reaction. The reaction between hydrogen and oxygen produces water. Thus, the exhaust contains a large amount of water. A gas-liquid separator separates the water from the exhaust. The exhaust that is free from water (air off-gas) is discharged from an exhaust passage, and the water is discharged out of the system through, for example, an external exhaust valve.

When the vehicle travels outdoors, as long as the water, which is contained in a tank, is discharged little by little as the vehicle travels, this should not cause any problems. However, when a large amount of water is discharged, this will soak the road or the like and is therefore not preferable. When the vehicle is an indoor-operated vehicle or a forklift, which is operated in a building and goes back and forth between indoor and outdoor locations, the discharge of water from the tank at an indoor location will wet the floor and is therefore not preferable.

Japanese Laid-Open Patent Publication No. 2007-141475 discloses a generated water atomizing device that atomizes the water generated in the fuel cell and discharges the atomized water into the atmosphere. The generated water atomizing device includes an electric drain pump that draws in water from a tank and pressurizes the water that has been drawn in. The water ejected from the drain pump passes through a minute nozzle and is sprayed out of an ejection port. This releases atomized water out of the vehicle. Japanese Laid-Open Patent Publication No. 2009-26498 discloses a generated water atomizing device that includes a nozzle, which discharges generated water, and an air pipe, which surrounds the nozzle. In this device, high-temperature air, which is pressurized by an air compressor, is supplied to the air pipe to atomize the generated water discharged from the nozzle. Such devices diffuse the water that is released into the atmosphere and prevents the road or floor from being made wet.

However, in a fuel cell system using the generated water atomizing device described in Japanese Laid-Open Patent Publication No. 2007-141475, the drain pump must be used to pressurize and atomize water. Thus, the generated water atomizing device described in Japanese Laid-Open Patent Publication No. 2007-141475 requires energy to drive the drain pump and space for installing the drain pump. Further, the drain pump is a movable component and thus has limited durability. Further, additional cost is necessary for installing the drain pump.

SUMMARY OF THE INVENTION

It is an object of the present invention to provide a fuel cell system that atomizes water, which is contained in a tank, and discharges the water from an outlet pipe without using a drain pump.

To achieve the above object, one aspect of the present invention provides a fuel cell system including a fuel cell, a gas-liquid separator, a tank, an outlet pipe, and an inlet pipe. The gas-liquid separator separates off-gas, which is discharged from the fuel cell, into water and gas. The tank is capable of containing the water separated by the gas-liquid separator. The outlet pipe discharges the gas separated by the gas-liquid separator out of the gas-liquid separator. The outlet pipe includes a venturi. The inlet pipe draws the water contained in the tank into the venturi. The water contained in the tank is drawn through the inlet pipe into the venturi to be atomized and discharged as atomized water from the outlet pipe.

A further aspect of the present invention provides a fuel cell system including a fuel cell, a gas-liquid separator, a tank, an outlet pipe, a pressure regulation valve, and an inlet pipe. The gas-liquid separator separates off-gas, which is discharged from the fuel cell, into water and gas. The tank is capable of containing the water separated by the gas-liquid separator. The outlet pipe discharges the gas separated by the gas-liquid separator out of the gas-liquid separator. The pressure regulation valve is arranged in the outlet pipe to adjust pressure in the fuel cell. The inlet pipe draws the water contained in the tank into an inlet portion located downstream of the pressure regulation valve in the outlet pipe. The pressure regulation valve adjusts pressure downstream of the pressure regulation valve to be lower than pressure upstream of the pressure regulation valve to draw the water contained in the tank through the inlet pipe into the inlet portion in which the water is atomized into atomized water and discharged from the outlet pipe.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 38 is an enlarged cross-sectional view showing part of an outlet pipe in the ninth embodiment.

DETAILED DESCRIPTION OF THE PREFERRED EMBODIMENTS

A first embodiment of the present invention applied to a fuel cell system for a forklift, which is used as an indoor industrial vehicle, will now be discussed with reference to FIGS. 1 to 5. A state in which a driver sits in a forklift 10 shown in FIG. 1 facing toward the front (forward direction, i.e., left direction as viewed in FIG. 1) of the forklift 10 will be used as a frame of reference for the terms "front", "rear", "left", "right", "up", and "down" in this specification.

Figure 1:
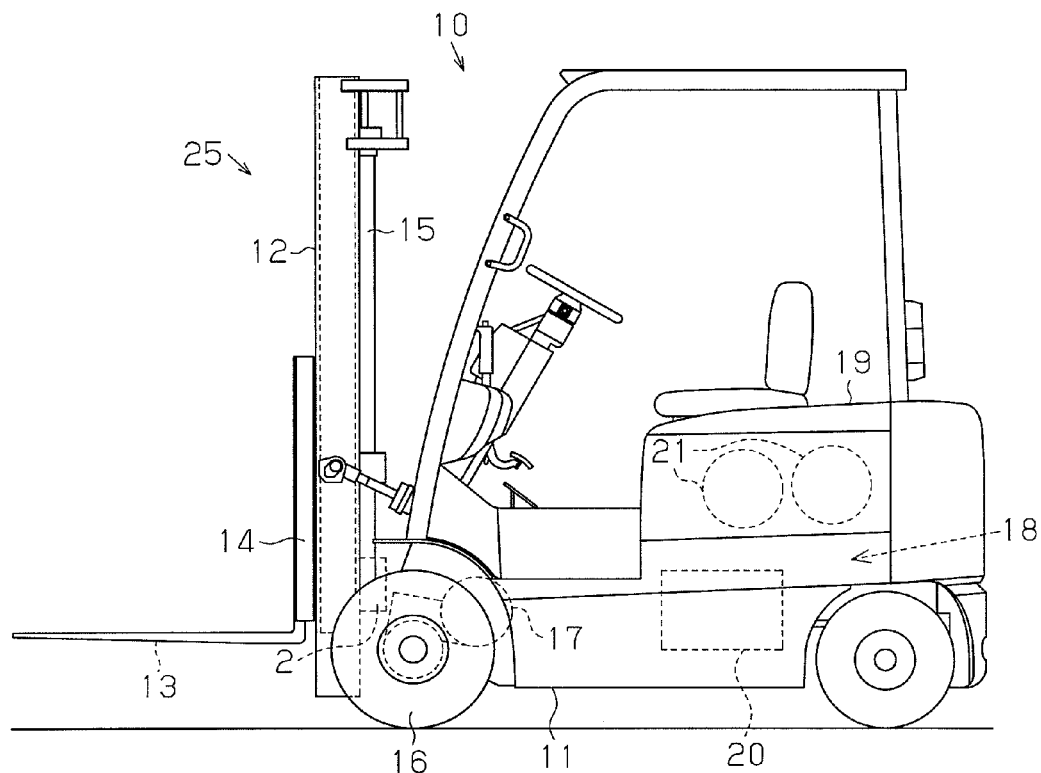
FIG. 1 is a schematic side view of a forklift including a fuel cell system according to first to ninth embodiments of the present invention.

As shown in FIG. 1, the forklift 10, which serves as an indoor industrial vehicle, includes a mast 12 arranged on a front part of a vehicle body 11. The mast 12 includes a fork 13, which is lowered and raised by a lift bracket 14. A lift cylinder 15 produces projection and retraction actions that lower and raise the fork 13 together with the lift bracket 14. Drive wheels (front wheels) 16 are arranged in a front lower part of the vehicle body 11. A drive motor 17 drives the drive wheels 16 by means of a differential device (not shown), which is mounted on an axle, and gears (not shown). A fuel cell system 18 is installed at the rear of the vehicle body 11. Further, the fuel cell system 18 is covered by a hood 19. The fuel cell system 18 is used as a power source for an oil pressure motor 2, which serves as an oil pressure source for the lift cylinder 15 and a tilt cylinder, and the drive motor 17.

The fuel cell system 18 will now be described with reference to FIG. 2.

Figure 2:
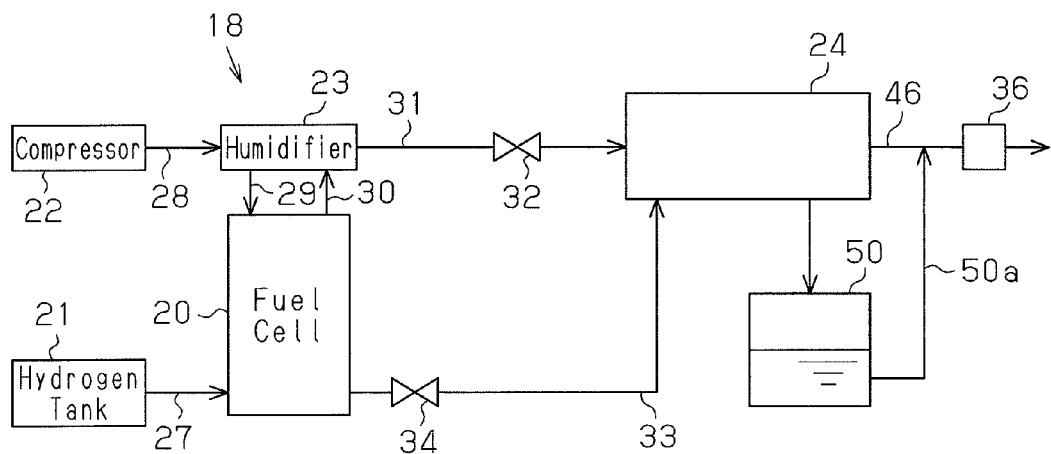
FIG. 2 is a schematic diagram of the fuel cell system according to the first embodiment.

As shown in FIG. 2, the fuel cell system 18 includes a fuel cell 20 and a hydrogen tank 21, which is connected to a hydrogen supply port (not shown) of the fuel cell 20 by a pipe 27. The fuel cell 20 is formed by, for example, a solid polymer fuel cell. The fuel cell system 18 also includes a compressor 22. The compressor 22 is connected to a humidifier 23 by a pipe 28. The humidifier 23 is connected to an oxygen supply port (not shown) of the fuel cell 20 by a supply pipe 29 and to an off-gas outlet port (not shown) by a pipe 30. Air compressed by the compressor 22 is humidified by the humidifier 23 and then supplied to the oxygen supply port (not shown) of the fuel cell 20. Off-gas (cathode off-gas) from a cathode electrode (not shown) of the fuel cell 20 is discharged into the humidifier 23 through the pipe 30.

The fuel cell 20 generates a direct current electric energy (direct current electrical power) causing reaction between the hydrogen supplied from the hydrogen tank 21 and the oxygen in the air supplied from the compressor 22. The pipe 27 includes a pressure regulation valve (not shown) that regulates the pressure of the hydrogen supplied to the fuel cell 20. The pressure regulation valve is a pressure control valve that reduces the high-pressure hydrogen stored in the hydrogen tank 21 to a predetermined pressure to supply the hydrogen under a constant pressure.

The humidifier 23 is connected to a gas-liquid separator 24 by a discharge pipe 31, which includes a pressure regulation valve 32. The fuel cell 20 has a hydrogen outlet port (not shown) connected to the gas-liquid separator 24 by a purge gas pipe 33, which serves as a hydrogen pipe, to discharge off-gas (anode off-gas) from an anode electrode (not shown) of the fuel cell 20 into the gas-liquid separator 24 through the purge gas pipe 33. The purge gas pipe 33 includes an open/close valve (anode purge valve) 34.

Next, the gas-liquid separator 24 will be described.

Figure 3:
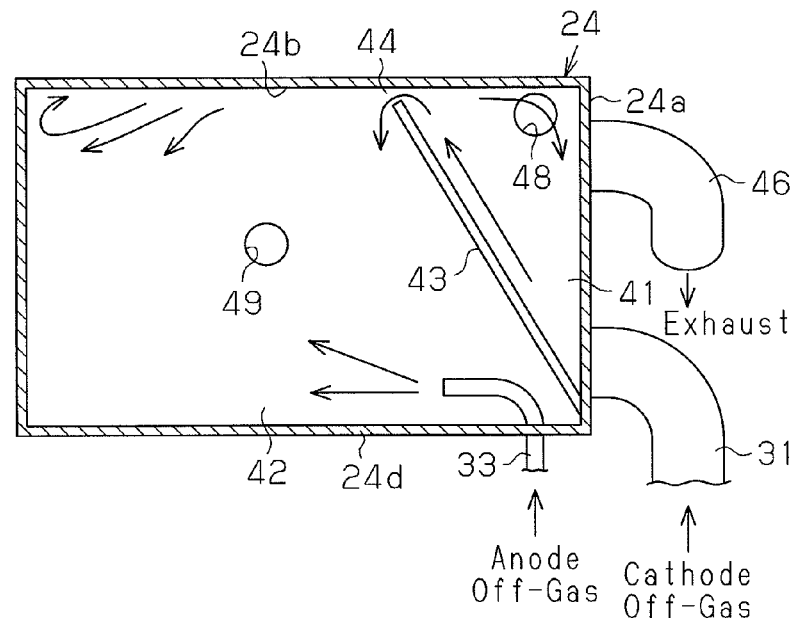
FIG. 3 is a cross-sectional plan view of a gas-liquid separator in the first embodiment.

As shown in FIG. 3, the gas-liquid separator 24 has the form of an elongated tetragonal box. The gas-liquid separator 24 includes a first chamber 41 and a second chamber 42, which are partitioned by a partition plate 43. The partition plate 43 has a basal end, which is fixed to a side plate 24a of the gas-liquid separator 24, and a distal end, which forms a gap 44 with an inner wall surface 24b of the gas-liquid separator 24 so that the first chamber 41 and the second chamber 42 are in communication.

The discharge pipe 31 is connected to the side plate 24a of the gas-liquid separator 24 in communication with the first chamber 41. The purge gas pipe 33 is connected to a side wall 24d of the gas-liquid separator 24 in communication with the second chamber 42. Further, an outlet pipe 46 is connected to the side plate 24a of the gas-liquid separator 24 in communication with the first chamber 41. A muffler 36 is arranged in the outlet pipe 46.

The gas-liquid separator 24 includes a first hole 48, which is formed at a position spaced apart from where the cathode off-gas drawn from the discharge pipe 31 flows, and a second hole 49, which is formed at a position spaced apart from a position where anode off-gas drawn from the purge gas pipe 33 flows.

Figure 4:
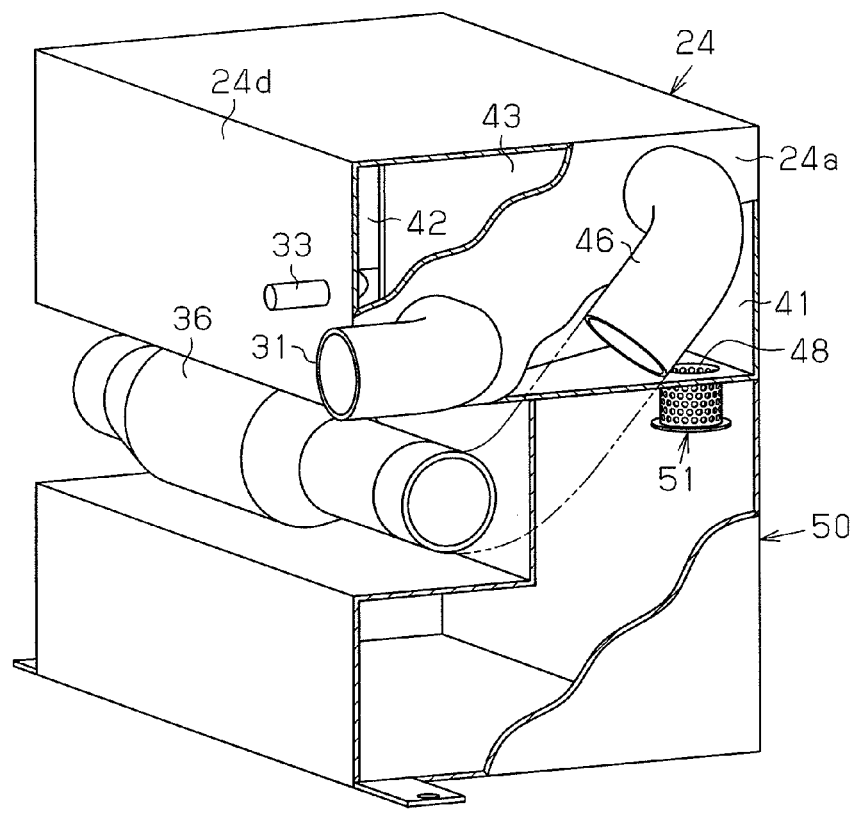
FIG. 4 is a schematic perspective view showing the gas-liquid separator and a tank in the first embodiment.

As shown in FIG. 4, a tank 50 is provided outside the gas-liquid separator 24. The tank 50 is attached to an outer surface of the gas-liquid separator 24. The gas-liquid separator 24 and the tank 50 are in communication with each other through the first hole 48 and second hole 49. Reverse flow preventers 51, which project into the tank 50, are arranged in the first hole 48 and second hole 49.

Figure 5:
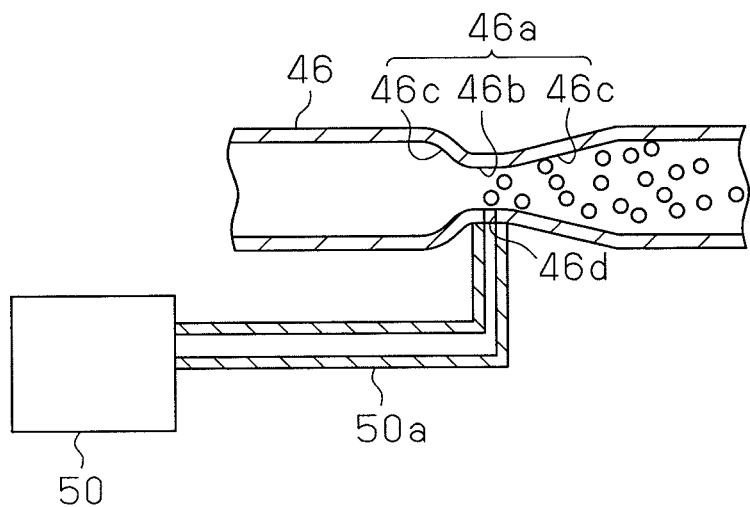
FIG. 5 is an enlarged cross-sectional view showing a venturi of an outlet pipe in the first embodiment.

As shown in FIG. 5, a venturi 46a is arranged in the outlet pipe 46. The venturi 46a includes a small-diameter portion 46b, which is the most constricted region in the outlet pipe 46, and diameter increasing portions 46c, the diameters of which increase from the small-diameter portion 46b toward the gas-liquid separator 24 and the muffler 36. The small-diameter portion 46b includes a through hole 46d, which serves as an inlet portion. An inlet pipe 50a has a first end, which is connected to the tank 50 to draw water from the tank 50 into the outlet pipe 46, and a second end, which is connected to the through hole 46d. The venturi 46a of the outlet pipe 46 is in communication with the tank 50 through the inlet pipe 50a.

The operation of the fuel cell system 18 according to the first embodiment will now be described.

In the fuel cell system 18, when the fuel cell 20 is in operation, hydrogen is supplied from the hydrogen tank 21 in a predetermined pressurized state to the anode (hydrogen electrode) of the fuel cell 20. The compressor 22 is operated to pressurize air to a predetermined pressure. The air is then humidified by the humidifier 23 and supplied to the cathode (air electrode) of the fuel cell 20. A catalyst dissociates the hydrogen supplied to the anode into hydrogen ions and electrons. The hydrogen ions move through an electrolytic membrane to the cathode together with water. At the cathode, the oxygen in the air supplied to the cathode, the hydrogen ions that have traveled through the electrolytic membrane and reached the cathode, and the electrons from an external circuit are bonded together to generate water. When the pressure regulation valve 32 opens, the water generated at the cathode is discharged into the humidifier 23 in a water vapor state together with non-reacted air as cathode off-gas and then drawn into the first chamber 41 of the gas-liquid separator 24 through the discharge pipe 31.

In the gas-liquid separator 24, the cathode off-gas drawn into the first chamber 41 from the discharge pipe 31 strikes the partition plate 43 and spreads out as it moves toward the distal side of the partition plate 43 and flows through the gap 44 into the second chamber 42. Some of the moisture contained in the cathode off-gas collects on the wall surface of the first chamber 41 and is separated from the cathode off-gas. The collected moisture then enters the tank 50 through the first hole 48.

Some of the water and nitrogen at the cathode spreads in a reversed direction on the electrolytic membrane from the cathode toward the anode. Thus, when the fuel cell 20 continues to operate, water and nitrogen are increased in concentration at the anode. When the concentrations reach a certain level or higher, the power generation efficiency decreases. To prevent or suppress such a state, at a certain time point, for example, the open/close valve 34 opens when the fuel cell 20 has been continuously operated for a predetermined time to perform anode purge. This discharges the moisture and nitrogen collected at the anode together with hydrogen gas into the purge gas pipe 33. The anode off-gas (purge gas) discharged from the fuel cell 20 into the purge gas pipe 33 by the anode purge is drawn into the second chamber 42 of the gas-liquid separator 24 through the purge gas pipe 33. Some of the moisture in the anode off-gas collects on the wall surface of the second chamber 42 and is separated from the anode off-gas. The collected moisture then enters the tank 50 through the second hole 49.

In the second chamber 42, the hydrogen concentration of the anode off-gas is diluted by the cathode off-gas. The gas mixture of the cathode off-gas and anode off-gas, from which water has been separated, is forced into the first chamber 41 through the second hole 49, the tank 50, and the first hole 48. Then, the gas mixture is discharged from the outlet pipe 46 out of the gas-liquid separator 24. The anode off-gas drawn from the purge gas pipe 33 into the second chamber 42 but not discharged from the second chamber 42 expands and spreads out. Thus, the anode off-gas is spread out throughout the entire second chamber 42. Then, the anode off-gas in the second chamber 42 passes into the first chamber 41 or passes as the gas mixture of the cathode off-gas and anode off-gas into the first chamber 41 through the tank 50. The anode off-gas that has passed into the first chamber in this manner is discharged from the outlet pipe 46 out of the gas-liquid separator 24 together with the flow toward the outlet pipe 46.

Due to the formation of the venturi 46a in the outlet pipe 46, the pressure at the small-diameter portion 46b in the outlet pipe 46 is lower than that in the diameter increasing portions 46c at the upstream side and downstream side of the small-diameter portion 46b. Thus, the flow velocity of the gas mixture flowing into the outlet pipe 46 from the first chamber 41 of the gas-liquid separator 24 suddenly increases when the gas mixture passes through the small-diameter portion 46b. Further, the pressure in the small-diameter portion 46b is lower than the pressure in the tank 50. This produces a pressure difference at the portion connecting the through hole 46d and the inlet pipe 50a. Further, the Venturi effect draws water from the tank 50 into the inlet pipe 50a. The water then enters the small-diameter portion 46b through the through hole 46d. In the small-diameter portion 46b, the drawn in water is atomized into atomized water by the gas mixture flowing at a suddenly increased flow velocity. The atomized water is then discharged together with the gas mixture via the muffler 36 into the atmosphere from an outlet port of the outlet pipe 46.

The first embodiment has the advantages described below.

(1) The venturi 46a is arranged in the outlet pipe 46, which is connected to the gas-liquid separator 24. Further, the inlet pipe 50a connects the tank 50 and the venturi 46a. Thus, the flow velocity of the gas mixture discharged from the gas-liquid separator 24 is suddenly increased when the gas mixture passes through the venturi 46a. The venturi effect draws water from the tank 50 into the inlet pipe 50a. The water then enters the venturi 46a of the outlet pipe 46. The drawn in water is atomized into atomized water by the gas mixture flowing at a suddenly increased flow velocity in the small-diameter portion 46b of the venturi 46a. The atomized water is then discharged into the atmosphere through the outlet pipe 46. Thus, just by arranging the venturi 46a in the outlet pipe 46, the water contained in the tank 50 is atomized and discharged into the atmosphere in the form of atomized water without using a drain pump. As a result, the forklift 10, which uses the fuel cell 20 as a drive source for traveling or working, does not drain water indoors and thus does not wet the floor.

(2) In the first embodiment, water collected in the tank 50 is atomized and discharged into the atmosphere without using a drain pump. Thus, to atomize the water contained in the tank 50, there is no need to pressurize water, for example, with a drain pump. This eliminates the need for energy to drive a drain pump and reduces the amount of energy consumed by the forklift 10. Further, there is no need to provide space for the drain pump. This allows for less space in the forklift 10. Further, in the first embodiment, a movable component such as a drain pump is not necessary. Thus, the problem of durability does not arise since a movable component is not used. Further, costs are reduced since a drain pump does not have to be installed.

(3) The gas-liquid separator 24 has a dilution function for diluting the hydrogen contained in the anode off-gas. Further, the purge gas pipe 33 connects the fuel cell 20 and the gas-liquid separator 24. Thus, when anode purge is performed to prevent or suppress reduction in power generation efficiency of the fuel cell 20, the anode off-gas is drawn into the gas-liquid separator 24. Then, the dilution function of the gas-liquid separator 24 dilutes the hydrogen contained in the anode off-gas. Accordingly, the fuel cell system 18 has a structure that is more compact than a structure in which a dilutor for diluting hydrogen is provided discretely from the gas-liquid separator 24.

A second embodiment of the present invention will now be discussed with reference to FIG. 6. In the following description of the second to ninth embodiments, the same reference numerals are given to those components that are the same as the corresponding components of the first embodiment. Such elements, which have already been described, will not be described in detail or not be described at all.

Figure 6:
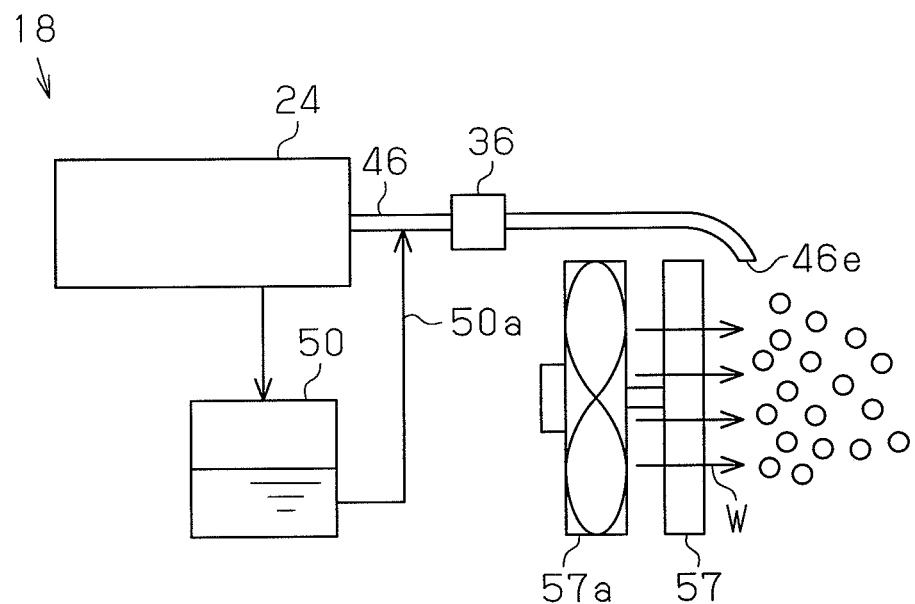
FIG. 6 is a schematic partial diagram of a fuel cell system according to the second embodiment.

As shown in FIG. 6, the fuel cell system 18 is arranged near a radiator 57, which serves as a heat source in the forklift 10. The radiator 57 includes a fan 57a and drives the fan 57a to produce an air current, which passes through the radiator 57. The outlet pipe 46 has an outlet port 46e arranged downstream relative to the radiator 57 in the air flow direction (direction of arrow W shown in FIG. 6). Atomized water discharged from the outlet port 46e of the outlet pipe 46 is discharged downstream of the radiator 57. Thus, the heat of the radiator 57 heats and vaporizes the atomized water.

In addition to advantages (1) to (3) of the first embodiment, the second embodiment has the advantage described below.

(4) The outlet port 46e of the outlet pipe 46 is positioned downstream of the radiator 57. Thus, the atomized water discharged from the outlet port 46e is heated and vaporized by the high-temperature heat generated by the radiator. This vaporizes the atomized water discharged from the outlet pipe 46 with the radiator 57 and discharges the vaporized water into the atmosphere.

The second embodiment may be modified as described below.

In the second embodiment, the outlet port 46e of the outlet pipe 46 is arranged downstream of the radiator 57. However, the outlet port 46e of the outlet pipe 46 may be arranged upstream of the radiator 57 and between the fan 57a and radiator 57. As a result, water discharged in an atomized state toward the upstream side of the radiator 57 is delivered into the radiator 57 by the current generated by the fan 57a. When passing through the radiator 57d, the heat of the radiator 57 vaporized the atomized water. Thus, the atomized water is more easily vaporized than when the outlet port 46e of the outlet pipe 46 is arranged of the radiator 57. Further, when passing through the radiator 57, the atomized water cools the radiator 57. In this case, the radiator 57 is preferably formed from a material that resists corrosion caused by water.

A third embodiment of the present invention will now be discussed with reference to FIGS. 7 and 8.

Figure 7:
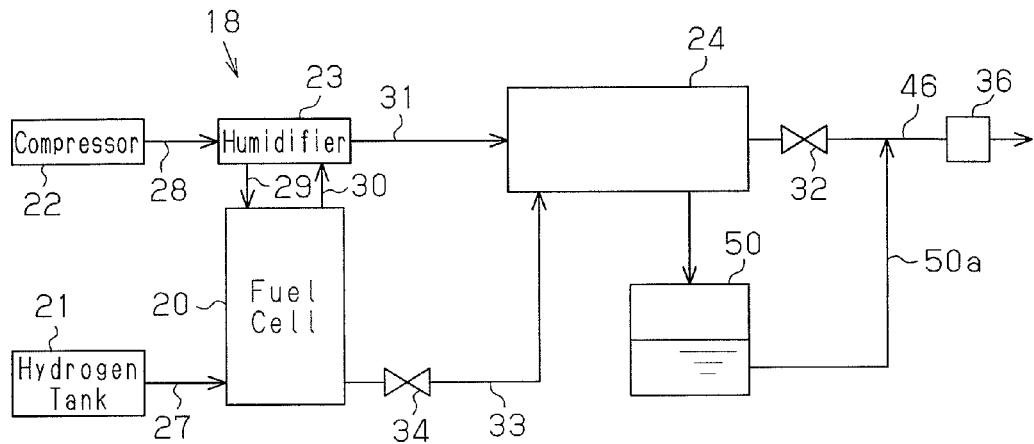
FIG. 7 is a schematic diagram of a fuel cell system according to the third embodiment.
Figure 8:
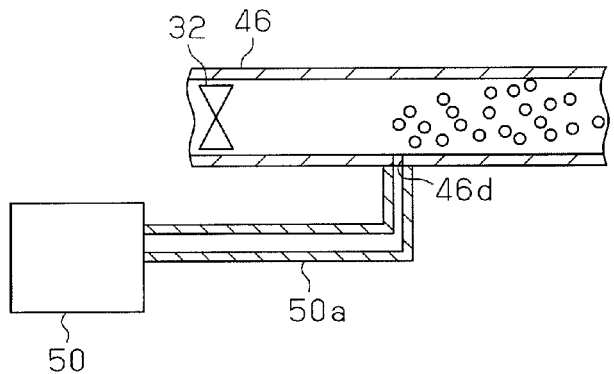
FIG. 8 is an enlarged cross-sectional view showing a connection portion between an outlet pipe and an inlet pipe in the third embodiment.

As shown in FIGS. 7 and 8, the pressure regulation valve 32 that adjusts the pressure in the fuel cell 20 is arranged in the outlet pipe 46. The pressure regulation valve 32 of the third embodiment is a so-called proportional valve that variably adjusts the pressure in the fuel cell 20 by adjusting its open degree between a valve-open position and a valve-closed position. As shown in FIG. 8, a through hole 46d, which serves as an inlet portion, is formed downstream relative to the position of the pressure regulation valve 32 in the outlet pipe 46.

The operation of the fuel cell system 18 according to the third embodiment will now be discussed centering on points differing from the first embodiment.

In the third embodiment, the pressure regulation valve 32 adjusts the pressure in the fuel cell 20 to a predetermined pressure.

As shown in FIG. 8, due to the pressure regulation valve 32 arranged in the outlet pipe 46, the pressure downstream relative to the position of the pressure regulation valve 32 in the outlet pipe 46 is lower than the pressure upstream relative to the position of the pressure regulation valve 32. In other words, there is a pressure difference in the outlet pipe 46 between the upstream and downstream sides of the pressure regulation valve 32. Thus, the gas mixture flowing into the outlet pipe 46 from the first chamber 41 of the gas-liquid separator 24 has a velocity that is higher after passing through the pressure regulation valve 32 than before passing through the pressure regulation valve 32. Further, the pressure downstream of the position where the pressure regulation valve 32 is arranged in the outlet pipe 46 is also lower than the pressure upstream of the pressure regulation valve 32 and the pressure in the tank 50. This pressure difference draws water from the tank 50 into the outlet pipe 46 through the inlet pipe 50a. The drawn in water is atomized into atomized water by the gas mixture flowing at a suddenly increased flow velocity. The atomized water is discharged into the atmosphere together with the gas mixture via the muffler 36 from the outlet port of the outlet pipe 46.

The third embodiment has the advantages described below.

(5) The pressure regulation valve 32 is arranged in the outlet pipe 46, which is connected to the gas-liquid separator 24. The tank 50 is connected by the inlet pipe 50a to the outlet pipe 46 at a position downstream of the pressure regulation valve 32. Thus, the flow velocity of the gas mixture discharged from the gas-liquid separator 24 is higher after passing through the pressure regulation valve 32 than before passing through the pressure regulation valve 32. Further, the pressure difference between the downstream side of the pressure regulation valve 32 in the outlet pipe 46 and the inside the tank 50 draws water from the tank 50 into the outlet pipe 46 through the inlet pipe 50a. The drawn in water is atomized into atomized water by the gas mixture flowing at a suddenly increased flow velocity. The atomized water is discharged into the atmosphere through the outlet pipe 46. Accordingly, advantages (1) and (2) of the first embodiment are also obtained.

(6) In the third embodiment, the water in the tank 50 is atomized and discharged into the atmosphere without using a drain pump just by arranging the pressure regulation valve 32 in the outlet pipe 46 downstream of the gas-liquid separator 24. Accordingly, advantage (2) of the first embodiment is achieved.

(7) The pressure regulation valve 32, which adjusts the pressure in the fuel cell 20, is arranged in the outlet pipe 46 downstream of the gas-liquid separator 24. Thus, the pressure regulation valve 32 adjusts the pressure in the fuel cell 20, while also atomizing water. This allows the structure of the fuel cell system 18 to be more compact than when, for example, a structure for atomizing water is provided separately from the pressure regulation valve 32.

(8) The pressure regulation valve 32 changes the pressure difference between the upstream and downstream sides of the pressure regulation valve 32 by adjusting the open degree between the valve-open position and valve-closed position. Thus, by controlling the pressure regulation valve 32, the flow velocity of the gas mixture is adjusted, and the droplet size of the atomized water is adjusted.

(9) Advantage (1) of the first embodiment is obtained.

A fourth embodiment of the present invention will now be discussed with reference to FIG. 9.

Figure 9:
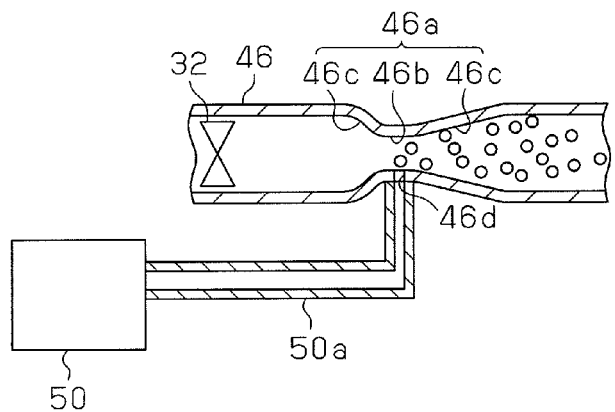
FIG. 9 is an enlarged cross-sectional view showing a connection portion between an outlet pipe and an inlet pipe in the fourth embodiment.

In the fourth embodiment, as shown in FIG. 9, the venturi 46a is arranged in the outlet pipe 46 downstream of the position of the pressure regulation valve 32.

In the fourth embodiment, the pressure at the small-diameter portion 46b of the outlet pipe 46 is lower than the pressure in the region extending from the downstream side of the pressure regulation valve 32 to just before the small-diameter portion 46b and the pressure in the downstream side of the small-diameter portion 46b. Thus, the flow velocity of the gas mixture flowing through the outlet pipe 46 increases suddenly as it passes through the small-diameter portion 46b. The pressure in the small-diameter portion 46b is lower than the pressure in the tank 50. This produces a pressure difference at the portion connecting the through hole 46d and the inlet pipe 50a. The venturi effect draws water from the tank 50 through the inlet pipe 50a, and the water enters the small-diameter portion 46b through the through hole 46d. In the small-diameter portion 46b, the drawn in water is atomized into atomized water by the gas mixture flowing at a suddenly increased flow velocity. The atomized water is then discharged into the atmosphere together with the gas mixture via the muffler 36 from the outlet port of the outlet pipe 46.

In addition to advantages (5) to (9) of the third embodiment, the fourth embodiment has the advantage described below.

(10) The venturi 46a is arranged in the outlet pipe 46 downstream relative to the position of the pressure regulation valve 32. Further, the inlet pipe 50a connects the tank 50 and the venturi 46a. Thus, the flow velocity of the gas mixture passing through the outlet pipe 46 increases after passing through the pressure regulation valve 32 and further increases when passing through the venturi 46a. Accordingly, the water drawn in from the tank 50 through the inlet pipe 50a is atomized into a mist having a smaller droplet size.

A fifth embodiment of the present invention will now be discussed with reference to FIG. 10.

Figure 10:
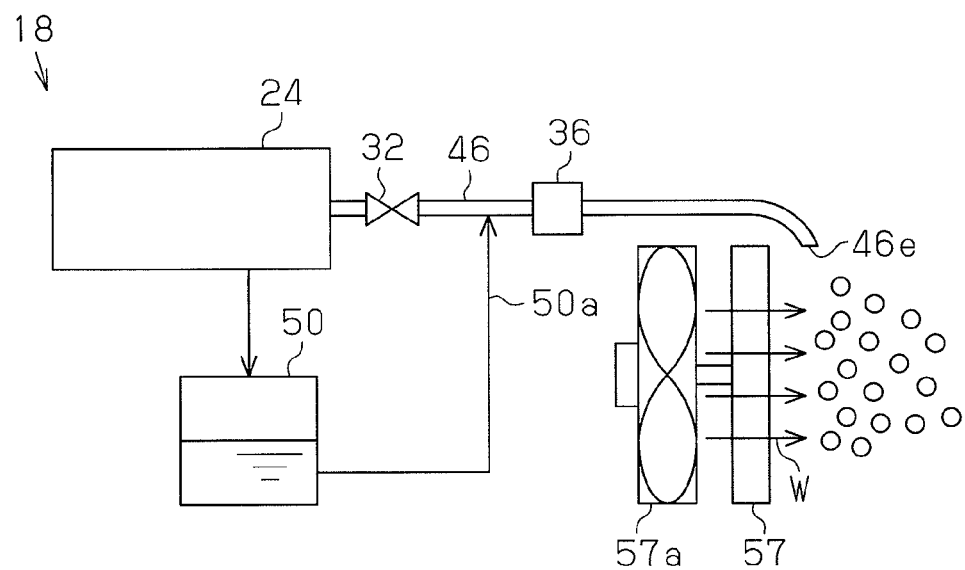
FIG. 10 is a schematic partial diagram of a fuel cell system according to the fifth embodiment.

As shown in FIG. 10, in the same manner as the second embodiment, the fuel cell system 18 is arranged near the radiator 57 that serves as a heat source in the forklift 10.

Advantages (2) of the second embodiment, advantages (5) to (9) of the third embodiment, and advantage (10) of the fourth embodiment are obtained in the fifth embodiment.

The third to fifth embodiments may be modified as described below.

Figure 11:
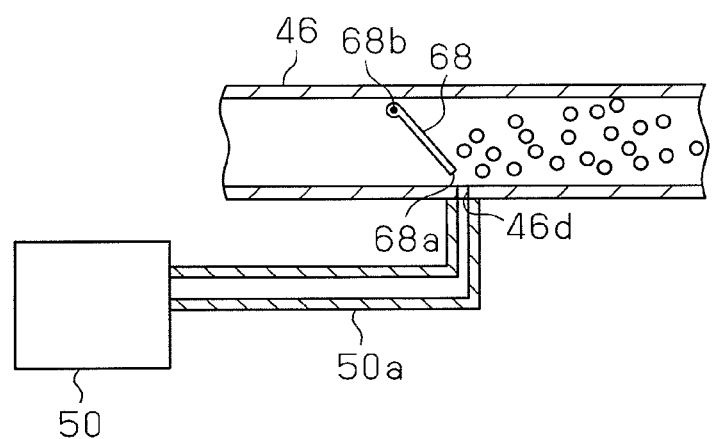
FIG. 11 is an enlarged cross-sectional view showing a connection portion between an outlet pipe and an inlet pipe in a further example.

In the third to fifth embodiments, the pressure regulation valve 32 is a so-called proportional valve that adjusts the pressure in the fuel cell 20 by adjusting the open degree between a valve-open position and a valve-closed position. However, the pressure regulation valve 32 is not limited to a proportional valve. For example, as shown in FIG. 11, a butterfly valve 68 serving as a pressure regulation valve may be arranged in the outlet pipe 46. The butterfly valve 68 rotates a shaft 68b with an actuator (not shown) between a valve-open position, which increases the cross-sectional area of the flow path in the outlet pipe 46, and a valve-closed position, which decreases the cross-sectional area of the flow path in the outlet pipe 46. The outlet pipe 46 has a through hole 46d, which serves as an inlet portion, formed at a position facing toward a distal end 68a of the butterfly valve 68 in a state in which the butterfly valve 68 is arranged at the valve-closed position. The inlet pipe 50a is connected to the through hole 46d.

Due to the butterfly valve 68 arranged in the outlet pipe 46, the cross-sectional area of the flow path for the gas mixture passing through the outlet pipe 46 is decreased when the butterfly valve 68 is at the valve-closed position. Further, the gas mixture suddenly increases its flow velocity as it passes through the gap between the distal end 68a of the butterfly valve 68 and an inner circumferential surface of the outlet pipe 46. Water drawn from the inlet pipe 50a through the through hole 46d into the outlet pipe 46 to the position facing toward the distal end 68a of the butterfly valve 68 is atomized into atomized water by the gas mixture flowing at a suddenly increased flow velocity. The atomized water is discharged into the atmosphere together with the gas mixture via the muffler 36 from the outlet pipe 46. This obtains the same advantages as the third embodiment without using the pressure regulation valve 32, which requires complicated control when employing a proportional valve.

In the fifth embodiment, the outlet port 46e of the outlet pipe 46 is arranged downstream of the radiator 57. However, in the same manner as the second embodiment, the outlet port 46e of the outlet pipe 46 may be arranged upstream of the radiator 57 and between the fan 57a and radiator 57.

A sixth embodiment of the present invention will now be discussed with reference to FIGS. 12 to 15.

Figure 13:
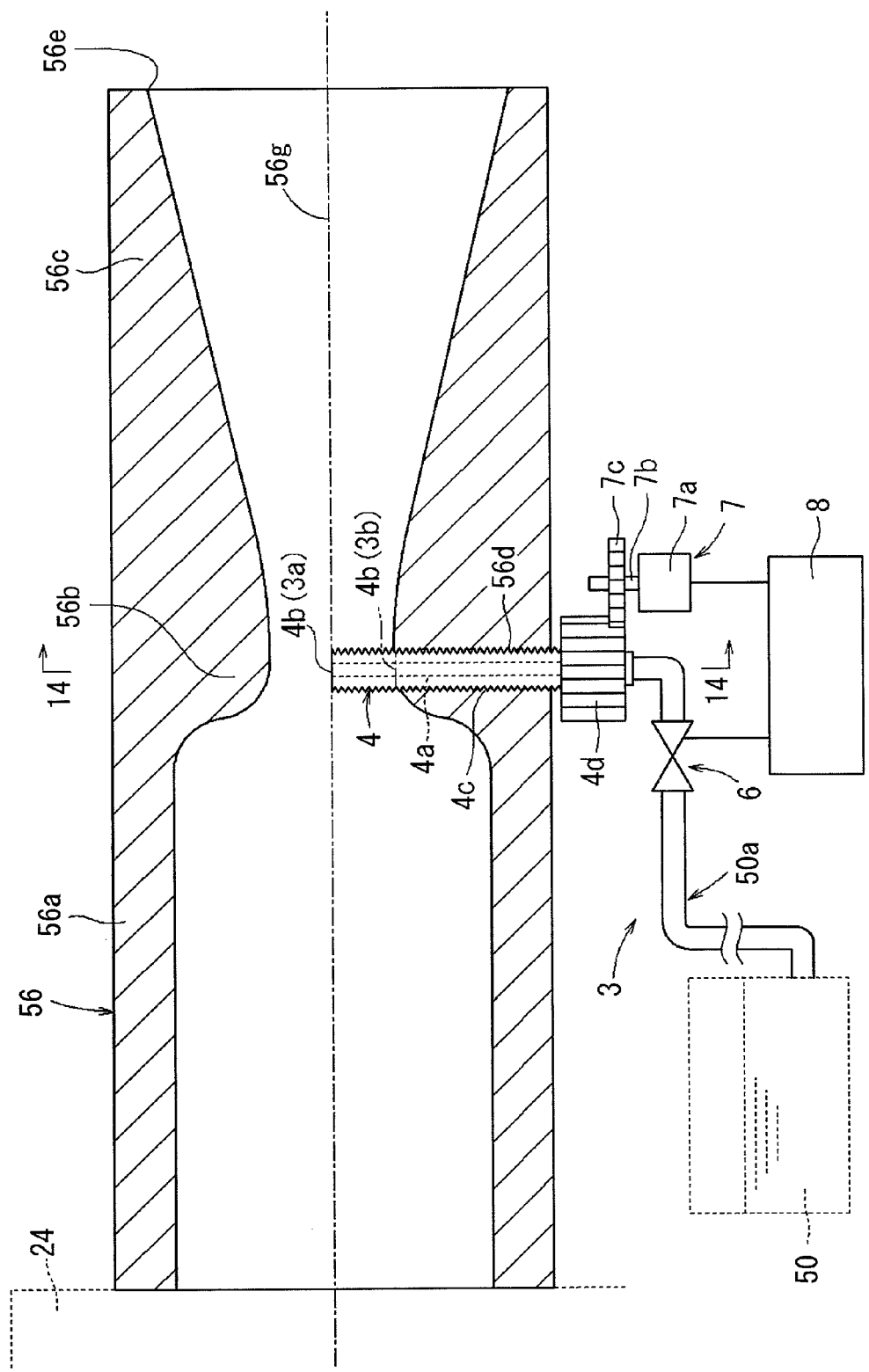
FIG. 13 is a cross-sectional view showing a generated water discharge device in the sixth embodiment.

Referring to FIG. 13, the outlet pipe 56 includes a pipe entrance portion 56a, a venturi 56b, and an expanding pipe portion 56c, which are formed integrally. The pipe entrance portion 56a is cylindrical and has inner and outer diameters that are generally the same over its entire length. Further, the pipe entrance portion 56a has a first end connected to the gas-liquid separator 24. The venturi 56b is a constricted part of the pipe and has an inner diameter that is smaller than that of the pipe entrance portion 56a. The expanding pipe portion 56c has an inner diameter that gradually increases from the venturi 56b toward an exit portion 56e. Accordingly the flow velocity of the gas flowing in the outlet pipe 56 is the highest in or near the venturi 56b.

The inlet pipe 50a extending from the tank 50 is connected to a nozzle 4, and a valve 6 is arranged in the inlet pipe 50a. The nozzle 4, which has an outer thread 4c formed on its outer circumferential surface, is fastened to a mounting hole 56d, which has an inner thread formed in the venturi 56b of the outlet pipe 56. This allows for the nozzle 4 to be movable in a radial direction of the inlet pipe 50a. The nozzle 4 has a water supply hole 4a, which is in communication with the inlet pipe 50a. A gear 4d is attached to a basal portion of the nozzle 4, and a gear 7c of a moving device 7 is mated with the gear 4d.

Figure 14:
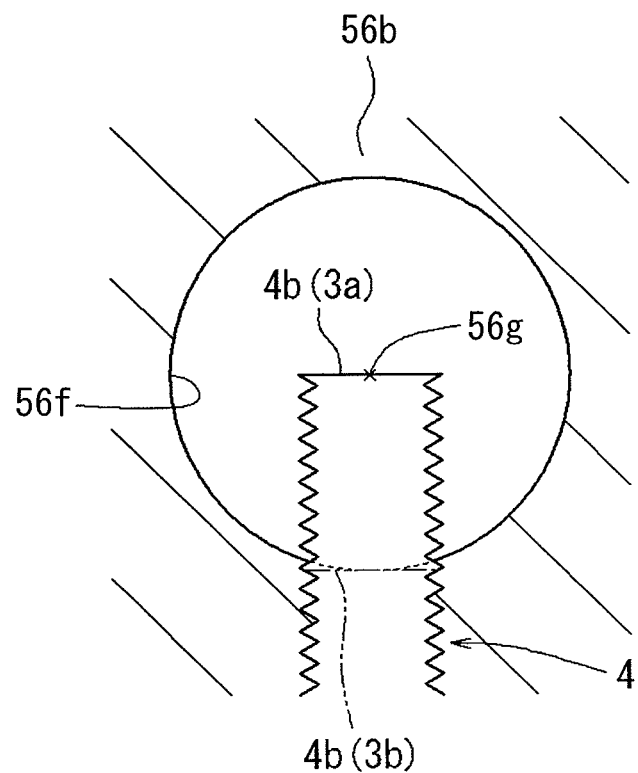
FIG. 14 is a partial cross-sectional view taken along line 14-14 in FIG. 13.

The moving device 7 includes a motor 7a, an output shaft 7b, and the gear 7c, as shown in FIG. 13. The motor 7a, which is a stepping motor, is controlled by a fuel cell control unit 8 (see FIG. 15) to rotate the output shaft 7b. As shown in FIGS. 13 and 14, this varies the protruding amount of the nozzle 4 from an inner circumferential surface 56f of the venturi 56b and moves the distal portion 4b of the nozzle 4 between an operating position 3a and a retracted position 3b. In the operating position 3a, the distal portion 4b of the nozzle 4 is arranged at a position near (preferably, on) a cross-sectional centerline 56g of the venturi 56b. In the retracted position 3b, the distal portion 4b of the nozzle 4 is arranged at a position near the inner circumferential surface 56f of the venturi 56b, at which the amount of the nozzle 4 protruded from the inner circumferential surface 56f toward the venturi 56b is small, preferably zero.

Figure 12:
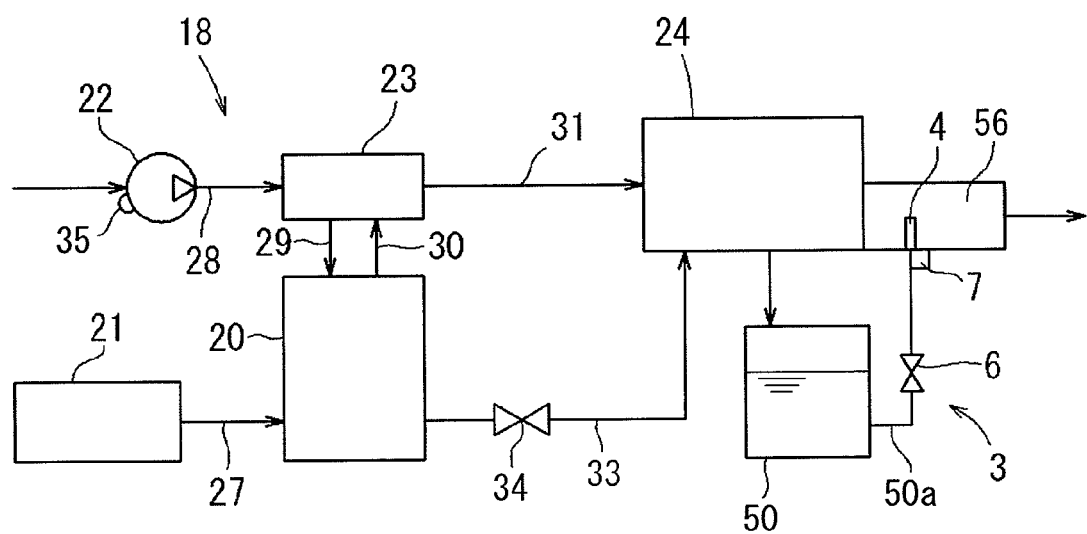
FIG. 12 is a schematic diagram of a fuel cell system according to the sixth embodiment.

Referring to FIGS. 12 and 13, the pressure in the tank 50 is increased by the exhaust from the fuel cell 20, and the pressure in the outlet pipe 56 is lower than the pressure in the tank 50 due to pressure loss. The pressure in the venturi 56b is lower than the pressure in the pipe entrance portion 56a due to the gas flowing through the outlet pipe 56. Accordingly, water is drawn from the tank 50 into the inlet pipe 50a using the pressure difference caused by the above-mentioned pressure loss or the pressure drop in the venturi 56b. The water is discharged from the distal portion 4b of the nozzle 4 through the inlet pipe 50a and the water supply hole 4a of the nozzle 4.

The water discharged into the distal portion 4b of the nozzle 4 is carried away and atomized by the exhaust flowing in the outlet pipe 56. In particular, the flow velocity of the exhaust is higher near the cross-sectional centerline 56g of the venturi 56b than near the inner circumferential surface of the venturi 56b. This carries away more water from the distal portion 4b of the nozzle 4. The atomized water is discharged together with the exhaust from the outlet pipe 56 into the atmosphere and out of the vehicle body 11 (see FIG. 1).

Figure 15:
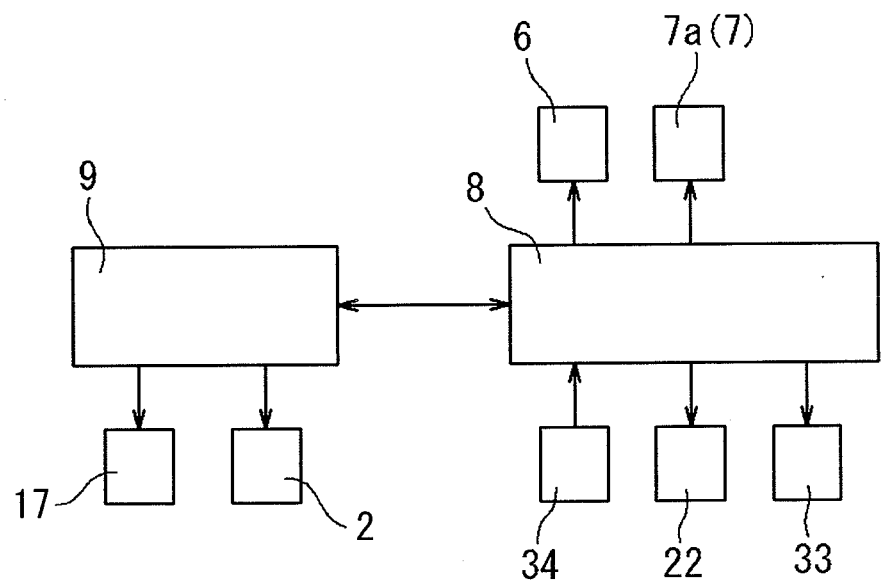
FIG. 15 is a schematic diagram showing a control unit in the sixth embodiment.

As shown in FIG. 15, the fuel cell control unit 8 is connected to a vehicle control unit 9. The vehicle control unit 9 is connected to various drive devices (such as the drive motor 17 and the oil pressure motor 2). The vehicle control unit 9 supplies the drive devices 17 and 2 with a predetermined level of power and transmits an information signal indicative of the power level to the fuel cell control unit 8. The fuel cell control unit 8 controls the moving device 7 in accordance with the level of the power supplied to the drive devices 17 and 2.

For example, when the power supplied to the drive motor 17 is greater than or equal to a predetermined level (when the vehicle is traveling) or when the power supplied to the oil pressure motor 2 is greater than or equal to a predetermined level (when carrying a load), the moving device 7 is controlled so as to move the nozzle 4 to the operating position 3a (see FIGS. 13 and 14). When the drive motor 17 and the oil pressure motor 2 are both supplied with power that is less than the predetermined level (when the vehicle is stopped or traveling at a low speed or during scavenging), the nozzle 4 is moved to the retracted position 3b.

As shown in FIG. 15, the fuel cell control unit 8 is connected the compressor 22 and a flow rate sensor 35. The flow rate sensor 35 is arranged in an intake port of the compressor 22. Thus, an output signal of the flow rate sensor 35 corresponds to the amount of air supplied by the compressor 22 to the fuel cell 20 and corresponds to the amount of exhaust discharged from the cathode side of the fuel cell 20. The fuel cell control unit 8 controls the valve 6 based on the output signal of the flow rate sensor 35. For example, when determining that the amount of exhaust from the fuel cell 20 is large based on the output signal of the flow rate sensor 35, the fuel cell control unit 8 increases the open degree of the valve 6 to increase the amount of water discharged from the nozzle 4. Contrarily, when determining that the amount of exhaust from the fuel cell 20 is small, the fuel cell control unit 8 decreases the open degree of the valve 6 to decrease the amount of water discharged from the nozzle 4.

In this manner, the forklift 10 includes the nozzle 4, moving device 7, and fuel cell control unit 8, as shown in FIG. 3. When the drive devices 17 and 2, which are driven by the power of the fuel cell 20, are both supplied with power that is greater than or equal to a predetermined value, the fuel cell control unit 8 moves the nozzle 4 to the operating position 3a. When at least one of the drive devices 17 and 2 is supplied with power that is less than the predetermined value, the nozzle 4 is moved to the retracted position 3b.

The intensity of noise (acoustic power) is generally proportional to the eighth power of the flow velocity of the gas flowing in the pipe. Thus, as long as the flow rate of the gas flowing in the outlet pipe 46 is the same, the noise becomes smaller as the gas flow velocity decreases or as the unevenness of the flow velocity decreases. More water can be atomized when discharged from near the cross-sectional centerline 56g of the venturi 56b where the flow velocity is high than when discharged from near the inner circumferential surface of the venturi 56b where the flow velocity is low.

In this respect, in the sixth embodiment, when the level of power supplied to the drive devices 17 and 2 is greater than or equal to the predetermined value and the noise produced when driving the drive devices 17 and 2 is large, the nozzle 4 is moved to the operating position 3a. Thus, even though noise is increased by the movement of the nozzle 4 to the operating position 3a that narrows the region corresponding to the venturi 56b of the outlet pipe 56, the noise is less noticeable due to the noise produced by driving the drive devices 17 and 2. Further, the movement of the nozzle 4 to the operating position 3a increases the amount of water that is discharged from the nozzle 4 and atomized.

When the power supplied to the drive devices 17 and 2 is less than the predetermined value, the noise produced by the drive of the drive devices 17 and 2 is small. However, the region corresponding to the venturi 56b of the outlet pipe 56 is widened due to the movement of the nozzle 4 to the retracted position 3b. This decreases the flow velocity in this region and reduces the noise produced from this area. Thus, the generation of noise is suppressed without decreasing the amount of generated water that is atomized. Further, the fuel cell control unit 8 adjusts the generation of noise by moving the nozzle 4. Thus, the generation of noise is adjusted with a satisfactory response.

The forklift 10 includes the drive motor 17 and the oil pressure motor (load handling drive device) 2, which serve as the drive devices, as shown in FIG. 1 and FIG. 15. The fuel cell control unit 8 moves the nozzle 4 to the operating position 3a when the power supplied to at least one of the drive motor 17 and the oil pressure motor 2 is greater than or equal to a predetermined value. When the drive motor 17 and the oil pressure motor 2 are both supplied with power than is less than the predetermined value, the control unit moves the nozzle 4 to the retracted position 3b.

Accordingly, the noise produced by the nozzle 4 is less noticeable due the noise produced when driving one of the drive motor 17 and oil pressure motor 2. For example, when the power supplied to the drive motor 17 is high (when the vehicle is traveling), the speed of the forklift 10 is increased. This increases road noise produced between the wheels (drive wheels 16 and rear wheels) and the floor surface. When the power supplied to the oil pressure motor 2 is high (during cargo handling), the noise produced by the oil pressure motor 2 and various members in a load handling device 25 driven by the oil pressure motor 2, such as chains (not shown) suspended on the mast 12 and the lift cylinder, increases. Thus, the noise produced by the nozzle 4 becomes less noticeable. In contrast, when the drive devices 17 and 2 are both stopped or driven at a low level, the nozzle 4 is moved to the retracted position 3b. This reduces the noise produced by the nozzle 4.

As shown in FIGS. 12 and 13, the outlet pipe 56 is connected downstream relative to the fuel cell 20. The fuel cell control unit 8 controls the open degree of the valve 6 in the inlet pipe 5 in accordance with the amount of exhaust from the fuel cell 20 to adjust the amount of generated water discharged from the nozzle 4 into the outlet pipe 46. Accordingly, when the amount of exhaust from the fuel cell 20 is large and the flow velocity of the exhaust flowing in the outlet pipe 56 is high, more water is atomized by increasing the amount of water discharged from the nozzle 4. On the other hand, when the amount of exhaust from the fuel cell 20 is small and the flow velocity of the exhaust flowing in the outlet pipe 56 is low, the amount of water discharged from the nozzle 4 is reduced. This lowers the amount of water sent to the outlet pipe 56 in a liquid state without being atomized.

As shown in FIG. 12, a muffler is not arranged downstream of the outlet pipe 56. Thus, the water contained in the exhaust from the outlet pipe 46 is not liquefied by a muffler. Further, space for installing the muffler is not necessary.

The sixth embodiment may be modified as described below.

For example, the nozzle 4 shown in FIG. 13 is movable in the venturi 56b of the outlet pipe 56. However, the nozzle 4 may be arranged to be movable in the pipe entrance portion 56a or the expanding pipe portion 56c. In this case, the nozzle 4 is moved to the operating position so that an end portion of the nozzle 4 is located near the venturi 56b in the vicinity of the cross-sectional centerline 56g of the venturi 56b. Further, the nozzle 4 is moved to the retracted position to decrease the amount of the end portion of the nozzle 4 protruding into the region corresponding to the venturi 56b (region parallel to the axial direction).

In the moving device 7 shown in FIG. 13, the motor 7a rotates the nozzle 4 around its axis with the gear 7c and gear 4d. However, the motor 7a may directly rotate the nozzle 4 around its axis. Alternatively, a moving device may move the nozzle 4 using gas pressure (generated, for example, by the compressor 22) or hydraulic pressure (for example, water pressure of the inlet pipe 50a).

The forklift 10 shown in FIG. 1 includes the oil pressure motor 2, which serves as the drive device for driving the load handling device 25. However, the load handling device 25 may be driven by an electric motor instead of the oil pressure motor 2.

The nozzle 4 shown in FIG. 12 is arranged in the outlet pipe 56, which is connected downstream of the fuel cell 20. However, in a structure in which an outlet pipe is connected to the compressor 22, the nozzle 4 may be arranged to be movable in the outlet pipe.

A seventh embodiment of the present invention will now be discussed with reference to FIGS. 16 to 20.

Figure 16:
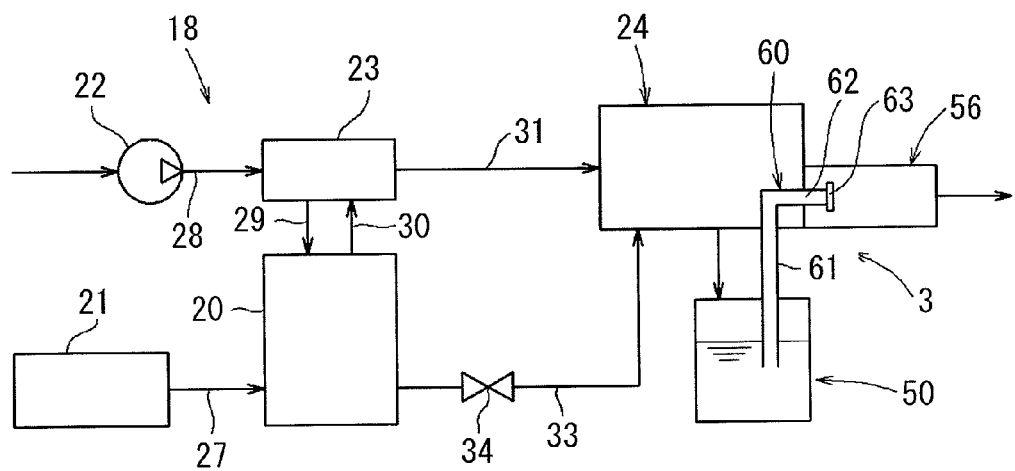
FIG. 16 is a schematic diagram of a fuel cell system according to the seventh embodiment.
Figure 17:
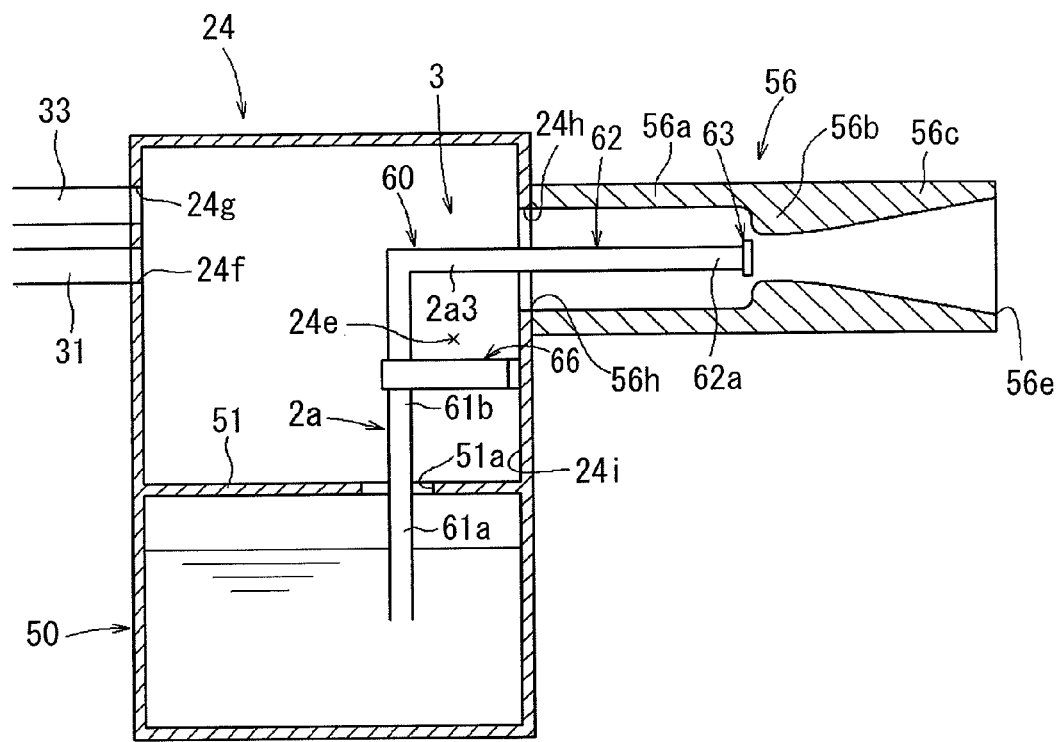
FIG. 17 is a cross-sectional view showing a generated water discharge device in the seventh embodiment.

The gas-liquid separator 24 includes intake ports 24f and 24g, which are connected to the pipes 31 and 33, and an outlet port 24h, which is connected to the outlet pipe 56, as shown in FIGS. 16 and 17. The tank 50 is formed with the lower side of the gas-liquid separator 24 with a partition plate 52 arranged in between. The partition plate 52 includes an open hole 52a. Thus, the exhaust discharged from the cathode side and anode side of the fuel cell 20 is separated into gas and liquid (generated water) in the gas-liquid separator 24 by the specific weight difference. The generated water, which is liquid, enters the tank 50 through the open hole 52a. In the gas-liquid separator 24, the concentration of hydrogen contained in the exhaust from the anode side may be diluted by the air contained in the exhaust from the cathode side. Gas is discharged from the gas-liquid separator 24 into the outlet pipe 56.

As shown in FIG. 3, a generated water discharge device 3 includes an inlet pipe 60 that extends into the outlet pipe 56 from the interior of the tank 50. The inlet pipe 60 includes a first pipe member 61 and a second pipe member 62, which are formed integrally and L-shaped, and a water deflection member 63. The first pipe member 61 includes a first part 61a, a second part 61b, and a third part 61c, which are formed integrally. The first part 61a extends in the vertical direction in the tank 50. The second part 61b extends upwards from the first part 61a in the gas-liquid separator 24. The third part 61c extends horizontally from the top portion of the second part 61b toward the outlet pipe 56.

Figure 20:
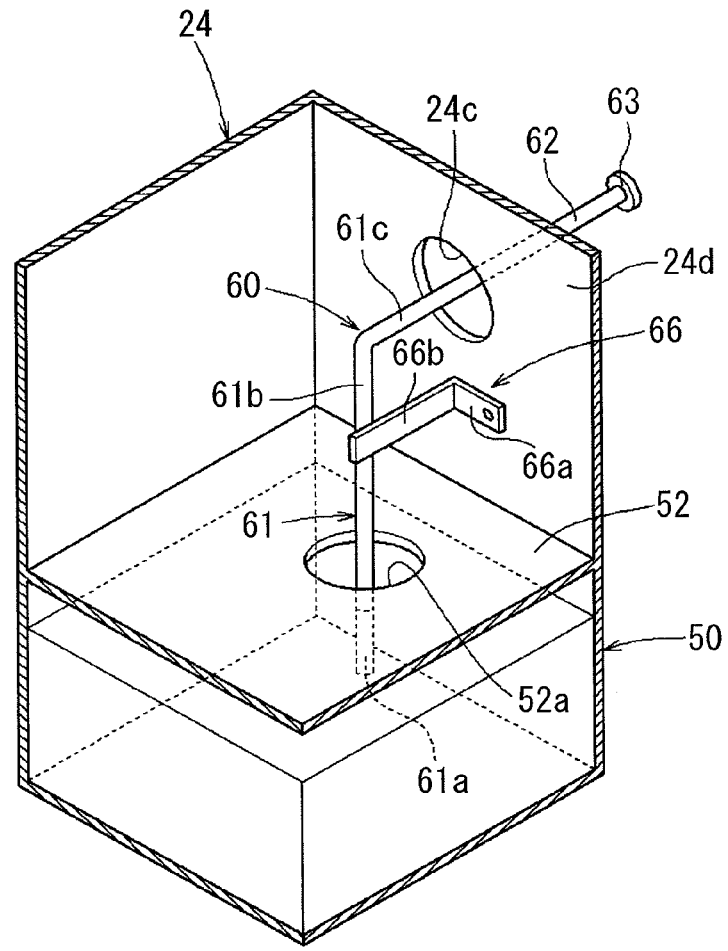
FIG. 20 is a perspective view showing a gas-liquid separator, part of a tank, an inlet pipe, and a bracket.

The first part 61a of the first pipe member 61 has a bottom end, which is located below the surface of the water contained in the tank 50, and a top end, which is located in the open hole 52a of the partition plate 52, as shown in FIGS. 17 and 20. The second part 61b is held by a bracket 66 at a position spaced from an inner wall surface 24i of the gas-liquid separator 24 by a predetermined distance (for example, 0.5 times to 2 times greater than the diameter of the outlet port 24h). The bracket 66 has a mounting portion 66a, which is attached to the inner wall surface 24i of the gas-liquid separator 24, and an extending portion 66b, which extends substantially perpendicular to and from the mounting portion 66a. The second part 61b is welded to an end of the extending portion 66b.

Figure 18:
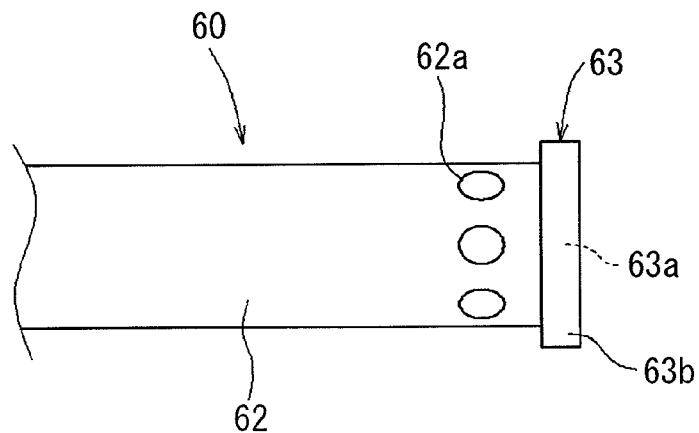
FIG. 18 is a partial front view of an inlet pipe in the seventh embodiment.

The second pipe member 62 extends horizontally from the third part 61c of the first pipe member 61 as shown in FIG. 17 and lies substantially along the cross-sectional center of the cylindrical outlet pipe 56 (preferably lies along the cross-sectional center). A plurality of water supply ports 62a are formed in a side wall portion near the distal end (for example, at a position spaced within 5 mm from the distal end) of the second pipe member 62 as shown in FIG. 18. The water supply ports 62a are, for example, circular holes and formed at predetermined intervals in the circumferential direction.

The water deflection member 63, which is disk-shaped and has a diameter that is larger than that of the second pipe member 62 as shown in FIG. 18, is attached to an end portion of the second pipe member 62. The water deflection member 63 includes a plug 63a, which closes the distal end of the second pipe member 62, and a flange 63b, which extends radially outward from the second pipe member 62. The flange 63b extends substantially perpendicular to the entire circumference of the second pipe member 62. The water deflection member 63 is arranged near the venturi 56b of the outlet pipe 56 as shown in FIGS. 17 and 19.

Figure 19:
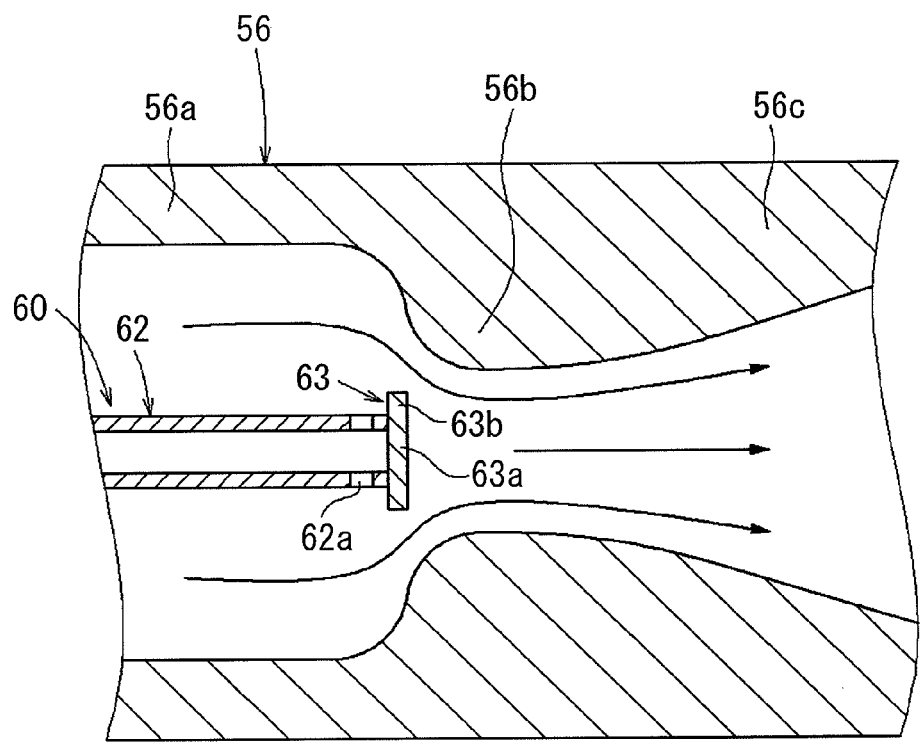
FIG. 19 is a partial cross-sectional view of an inlet pipe and an outlet pipe near a water deflection member in the seventh embodiment.

Referring to FIGS. 17 and 19, the outlet pipe 56 includes a pipe entrance portion 56a, a venturi 56b, and an expanding pipe portion 56c, which are formed integrally. The pipe entrance portion 56a is cylindrical and has inner and outer diameters that are generally the same over its entire length. Further, the pipe entrance portion 56a has one end 56h connected to the outlet port 24h of the gas-liquid separator 24. The venturi 56b is a constricted part of the outlet pipe 56 in which the inner diameter is smaller than that of the pipe entrance portion 56a. The inner diameter of the expanding pipe portion 56c gradually increases from the venturi 56b toward an exit portion 56e. Accordingly the flow velocity of gas flowing in the outlet pipe 56 is the highest in or near the venturi 56b.

Referring to FIG. 17, the pressure in the outlet pipe 56 is lower than the pressures in the gas-liquid separator 24 and tank 50 due to pressure loss. Further, the pressure in the venturi 56b is lower than the pressure in the pipe entrance portion 56a. The pressure difference resulting from the pressure loss is used to draw water from the tank 50 into the inlet pipe 60. The water flows through the first pipe member 61 and the second pipe member 62 of the inlet pipe 60. Then, as shown in FIG. 19, the water passes through the water supply ports 62a and moves from the inner side to the outer circumferential side of the second pipe member 62.

Referring to FIG. 19, the water flows in the axial direction along the outer circumferential surface of the second pipe member 62 toward the water deflection member 63. Then, the water flows in the radial direction along the flange 63b of the water deflection member 63 and moves to the outer circumferential end of the water deflection member 63. The water that has reached the outer circumferential end of the water deflection member 63 is carried away and atomized by the exhaust flowing around the water deflection member 63. In particular, the flow velocity of the exhaust is high near the venturi 56b. Thus, the water carried away by the water deflection member 63 has a small droplet size. This atomizes the water and discharges the atomized water together with the exhaust from the outlet pipe 56 into the atmosphere outside the vehicle body 11 (see FIG. 1).

As described above, the generated water discharge device 3 is provided with the outlet pipe 56, which includes the venturi 56b, and the inlet pipe 60 as shown in FIG. 17. The inlet pipe 60 includes the first pipe member 61, the second pipe member 62 with the water supply ports 62a, and the water deflection member 63 extending from the second pipe member 62 in the radial direction of the outlet pipe 56 near the venturi 56b. Water supplied through the water supply ports 62a to the outer circumferential surface of the second pipe member 62 moves to the end of the water deflection member 63, at which the water is atomized by the gas flowing in the outlet pipe 56.

Accordingly, water moves from the tank 50 to the end of the water deflection member 63, which is located near the venturi 56b. The venturi 56b increases the flow velocity of the gas flowing in the outlet pipe 56 so that the water is carried away and atomized by the gas at the end of the water deflection member 63. The water deflection member 63 has a simple structure extending from the second pipe member 62. Thus, the water deflection member 63 is not required to be accurately machined like in the prior art. This reduces the cost of the water deflection member 63.

The water deflection member 63 is arranged at the distal portion of the second pipe member 62 as shown in FIG. 18 to close the distal portion and extend radially from the entire circumference of the distal end. Since the water deflection member 63 closes the distal end of the second pipe member 62, the structure of the inlet pipe 60 lowers costs compared to a structure in which the distal portion of the second pipe member 62 is closed by another member. Further, the water deflection member 63 extends from the entire circumference of the distal portion of the second pipe member 62. Thus, more water is atomized as compared to a structure that extends from only from part of the distal portion.

The outlet pipe 56 is connected to the outlet port 24h of the gas-liquid separator 24, which mixes the exhaust from the anode side and the exhaust from the cathode side of the fuel cell 20, as shown in FIGS. 16 and 17. The first pipe member 61 extends from the tank 50 toward the outlet pipe 56 in the gas-liquid separator 24.

The exhaust from the fuel cell 20 has a high temperature of, for example, 50° C. or greater. Thus, the exhaust in the gas-liquid separator 24 transfers heat to the first pipe member 61 in the gas-liquid separator 24. As the exhaust discharged from the gas-liquid separator 24 flows into the outlet pipe 56, the exhaust transfers heat to the second pipe member 62 in the outlet pipe 56. This prevents the problem of breakage of the inlet pipe 60 when water freezes in the inlet pipe 60 in a cold region or the like. When water in the inlet pipe 60 freezes during deactivation of the fuel cell 20, activation of the fuel cell 20 would melt the frozen water in the inlet pipe 60. Thus, the generated water discharge device 3 may be used even in a cold region or the like. In the seventh embodiment, the temperature of the exhaust is used. This consumes less power than when using another heat source and allows for a more compact structure.

The first pipe member 61 is held in the gas-liquid separator 24 by the bracket 66 attached to the gas-liquid separator 24, as shown in FIG. 20, at a position spaced apart by a predetermined distance from the inner wall surface 24i of the gas-liquid separator 24. Thus, in a cold region or the like, when the fuel cell 20 is deactivated, the gas-liquid separator 24 is first cooled by ambient air. This condenses water on the inner wall surface 24i of the gas-liquid separator 24. The first pipe member 61 is insulated by an air layer formed between the first pipe member 61 and the inner wall surface 24i of the gas-liquid separator 24. This results in the first pipe member 61 being cooled later than the inner wall surface 24i of the gas-liquid separator 24. Thus, the condensation of water on the outer surface of the first pipe member 61 is suppressed, and breakage of the first pipe member 61 caused by frozen condensed water is prevented.

The second pipe member 62 extends substantially parallel to the flow of gas in the outlet pipe 56 and substantially along the cross-sectional center of the venturi 56b of the outlet pipe 56 as shown in FIGS. 17 and 19. The forklift 10, which includes a fuel cell, generally produces less noise than a forklift powered by an engine. Thus, the arrangement of the generated water discharge device 3 in the forklift 10, which includes the fuel cell, produces noise that may be a problem. The intensity of noise (acoustic power) is generally proportional to the eighth power of the flow velocity of the gas flowing in the pipe. Thus, as long as the flow rate of the gas flowing in the outlet pipe 56 is the same, the noise becomes smaller as the unevenness of the flow velocity (flow velocity difference) decreases.

In this respect, the second pipe member 62 in the seventh embodiment is substantially parallel to the flow of gas flowing in the outlet pipe 56. This decreases the area that inhibits the gas flow in the outlet pipe 56 compared to a structure in which the second pipe member is perpendicular to the gas flowing in the outlet pipe 56. Thus, the flow velocity of gas in the outlet pipe 56 remains even. Further, the second pipe member 62 extends substantially along the cross-sectional center of the venturi 56b. This avoids the formation of a region in which the flow velocity is low as would be formed if the second pipe member were to be extended near and along the wall surface of the outlet pipe 56. Therefore, the second pipe member 62 hardly makes the flow velocity of gas inside the outlet pipe 56 uneven. Thus, in the seventh embodiment, the generated water discharge device 3 reduces noise.

The inlet pipe 60 is held at a position spaced apart from the inner wall surface 24i as shown in FIG. 17. Thus, even if the gas in the gas-liquid separator 24 strikes the first pipe member 61 of the inlet pipe 60 and increases the unevenness of the gas flow velocity, the unevenness would be reduced by a flow adjusting portion 24e between the inlet pipe 60 and inner wall surface 24i. Since the unevenness of the flow velocity of the gas flowing from the interior of the gas-liquid separator 24 into the outlet pipe 56 is reduced, the noise generated in the outlet pipe 56 is reduced. As shown in FIG. 16, a muffler is not arranged downstream of the outlet pipe 56. Thus, the water contained in the exhaust from the outlet pipe 56 is not liquefied by a muffler.

The seventh embodiment may be modified as described below.

Figure 21:
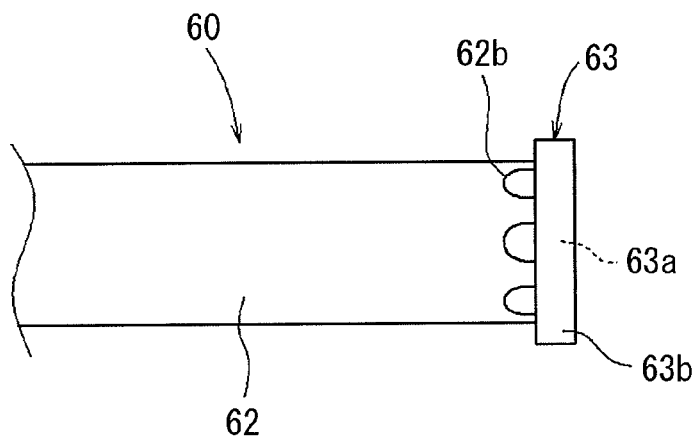
FIG. 21 is a partial front view showing an inlet pipe in a further example.

For example, the second pipe member 62 shown in FIG. 18 includes the water supply ports 62a, which are in the form of circular holes. Instead of the water supply ports 62a shown in FIG. 18, the second pipe member 62 may have slit-shaped water supply ports 62b that extend from the distal portion, as shown in FIG. 21.

Figure 22:
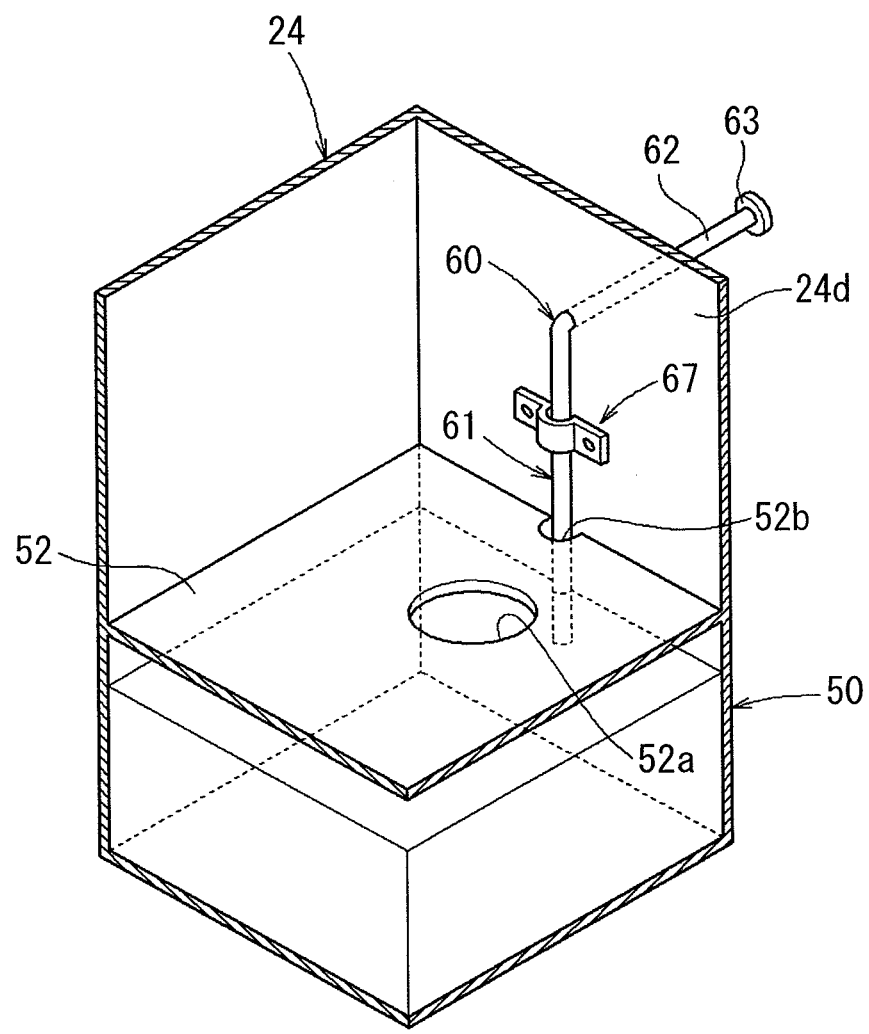
FIG. 22 is a perspective view showing a gas-liquid separator, part of a tank, an inlet pipe, and a bracket in a further example.

The first pipe member 61 of the inlet pipe 60 shown in FIG. 20 is held by the bracket 66 at a position spaced apart by a predetermined distance from the inner wall surface 24i of the gas-liquid separator 24. Referring to FIG. 22, instead, the first pipe member 61 may be held by a bracket 67 in contact with the inner wall surface 24i of the gas-liquid separator 24, with a lower part extending through a through hole 52b formed in the partition plate 52 and arranged below the surface of the water contained in the tank 50. In this structure, the first pipe member 61 receives heat directly from the exhaust in the gas-liquid separator 24 or from the wall surface of the gas-liquid separator 24 heated by the exhaust.

Figure 23:
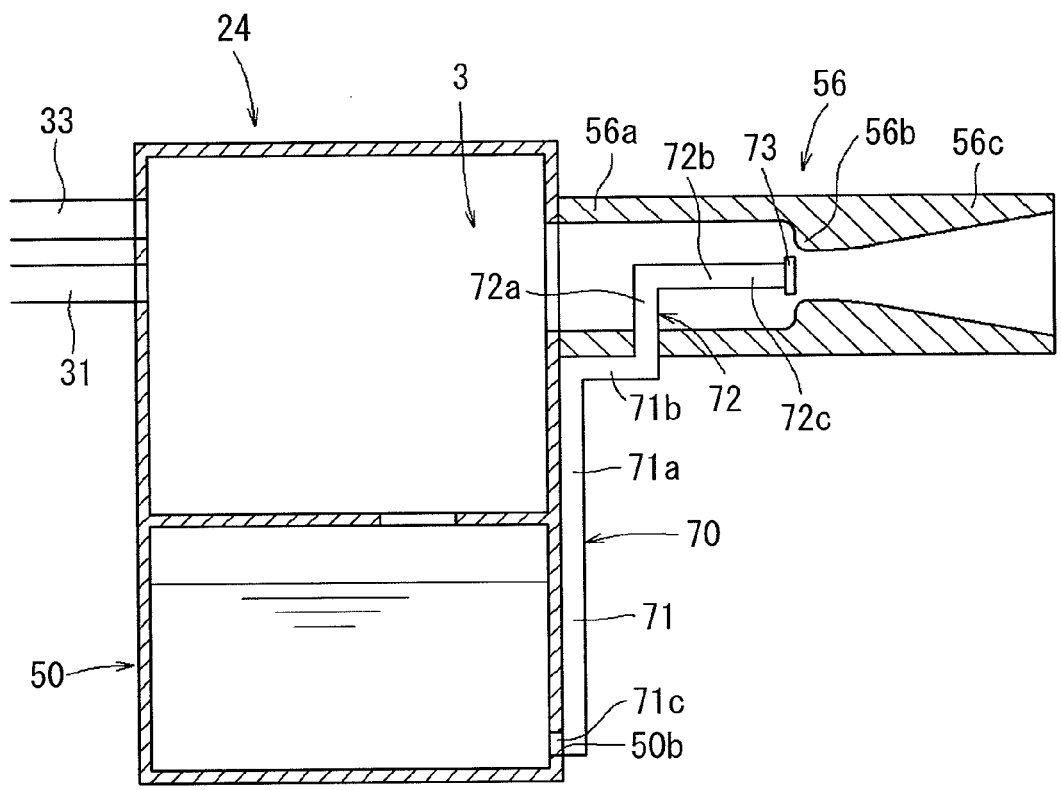
FIG. 23 is a partial cross-sectional view of a fuel cell system in a further example.

The first pipe member 61 of the inlet pipe 60 shown in FIG. 17 extends through the gas-liquid separator 24 from the tank 50 toward the outlet pipe 56. However, an inlet pipe 70 may be used in lieu of the inlet pipe 60, as shown in FIG. 23. The inlet pipe 70 has a first pipe member 71, a second pipe member 72, and a water deflection member 73. The first pipe member 71 has a first part 71a, which extends in contact with an outer wall surface of the gas-liquid separator 24 from the tank 50 toward the outlet pipe 56, and a second part 71b, which extends along an outer circumferential surface of the outlet pipe 56. A connection port 71c formed at the bottom portion of the first part 71a is connected to a water discharge port 50b formed in the tank 50. The first pipe member 71 is preferably covered by an insulative material (not shown) so that it is not exposed to ambient air. Thus, the first pipe member 71 receives heat of the exhaust through the wall surface of the gas-liquid separator 24, which is heated by the exhaust.

As shown in FIG. 23, the second pipe member 72 has a first part 72a, which extends in the radial direction in the pipe entrance portion 56a of the outlet pipe 56, and a second part 72b, which extends axially from the first part 72a. The second part 72b extends substantially along the cross-sectional center of the cylindrical outlet pipe 56. A water supply port 72c is formed at the distal portion of the second part 72b so that water is supplied from an inner side of the second part 72b to an outer circumferential surface of the second part 72b. The water deflection member 73, which is arranged at one end of the second pipe member 72, extends radially relative to the second pipe member 72 near the venturi 56b.

The inlet pipe 60 shown in FIG. 19 has the second pipe member 62, which extends axially relative to the outlet pipe 56, and the water deflection member 63, which extends radially relative to the outlet pipe 56 from the second pipe member 62. However, an inlet pipe 80 shown in FIG. 24 may be used in lieu of the inlet pipe 60 shown in FIG. 19. The inlet pipe 80 includes a first pipe member 81, a second pipe member 82, and a water deflection member 83. The first pipe member 81 extends from the tank side to the outer circumferential surface of the outlet pipe 56. The second pipe member 82 extends through the wall surface of the outlet pipe 56 from the outer circumferential surface to the inner circumferential side of the outlet pipe 56.

Figure 24:
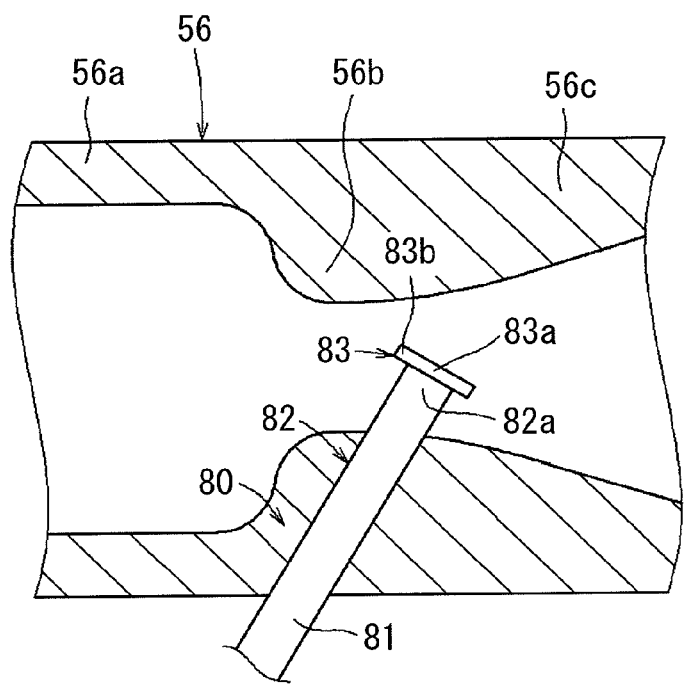
FIG. 24 is a partial cross-sectional view of an inlet pipe and an outlet pipe in a further example.

As shown in FIG. 24, the distal portion of the second pipe member 82 extends radially relative to the outlet pipe 56 in the venturi 56b and diagonally from the upstream side to the downstream side (toward the right as viewed in the drawing). A water supply port 82a is formed in the distal portion of the second pipe member 82 to supply water from the inside of the second pipe member 82 to an outer circumferential surface of the second pipe member 82. The water deflection member 83 is arranged at one end of the second pipe member 82 extending radially relative to the second pipe member 82 and extend radially and diagonally to the axial direction relative to the outlet pipe 56.

As shown in FIG. 16, the water deflection member 63 of the inlet pipe 60 is arranged in the outlet pipe 56, which is connected to the exhaust side of the fuel cell 20. Instead, a compressor or the like may be connected to the outlet pipe 56, and a water deflection member of an inlet pipe may be arranged near or inside a venturi formed in the outlet pipe.

The flange 63b of the water deflection member 63 shown in FIGS. 18 and 21 is planar and has parallel upstream and downstream side surfaces (right and left sides as viewed in the drawing). However, a chamfer (tapered surface) may be provided in the circumferential portion of the downstream surface (right side as viewed in the drawing) of the flange 63b. This allows for water to be atomized with a smaller droplet size at the end of the water deflection member 63. Further, the inlet pipe 60 shown in FIGS. 18 and 21 includes the water supply ports 62a or 62b. A throttle may be arranged in part of the inlet pipe 60 to prevent too much water from being discharged from the water supply ports 62a or 62b.

The inlet pipe 60 shown in FIG. 18 and FIG. 21 includes the water supply ports 62a or 62b, which are formed near the distal portion of the second pipe member 62, and the water deflection member 63, which is formed at the distal portion of the second pipe member 62. Instead, the second pipe member 62 may include one or more holes, and the downstream side (right side as viewed in the drawing) of each hole may include one or more water deflection members that extend in the radial direction relative to the outlet pipe from the outer surface of the second pipe member 62.

The outlet pipe 56 shown in FIG. 17 includes the pipe entrance portion 56a, the venturi 56b, and the expanding pipe portion 56c. However, the pipe entrance portion may be eliminated, and the outlet pipe 56 may include only the venturi 56b and the expanding pipe portion 56c.

An eighth embodiment of the present invention will now be discussed with reference to FIGS. 25 to 27.

Figure 26:
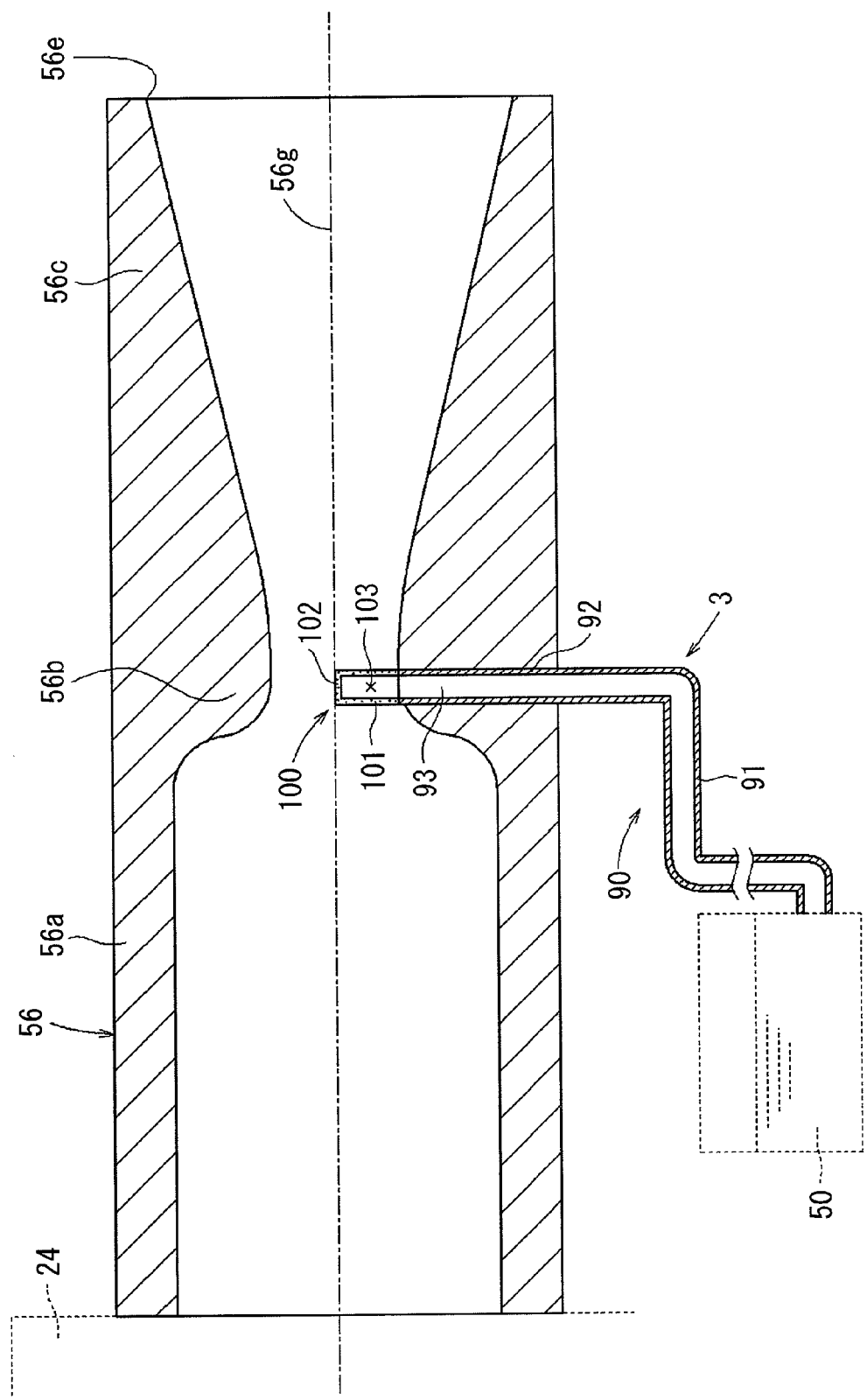
FIG. 26 is a cross-sectional view showing a generated water discharge device in the eighth embodiment.

The outlet pipe 56 includes a pipe entrance portion 56a, a venturi 56b, and an expanding pipe portion 56c, which are formed integrally as shown in FIG. 26. The pipe entrance portion 56a is cylindrical and has inner and outer diameters that are generally the same over its entire length. Further, the pipe entrance portion 56a has a first end connected to the gas-liquid separator 24. The venturi 56b is a constricted part of the pipe of which the inner diameter is smaller than that of the pipe entrance portion 56a. The expanding pipe portion 56c has an inner diameter that gradually increases from the venturi 56b toward an exit portion 56e. Accordingly, the flow velocity of the gas flowing in the outlet pipe 56 is the highest in or near the venturi 56b.

Figure 25:
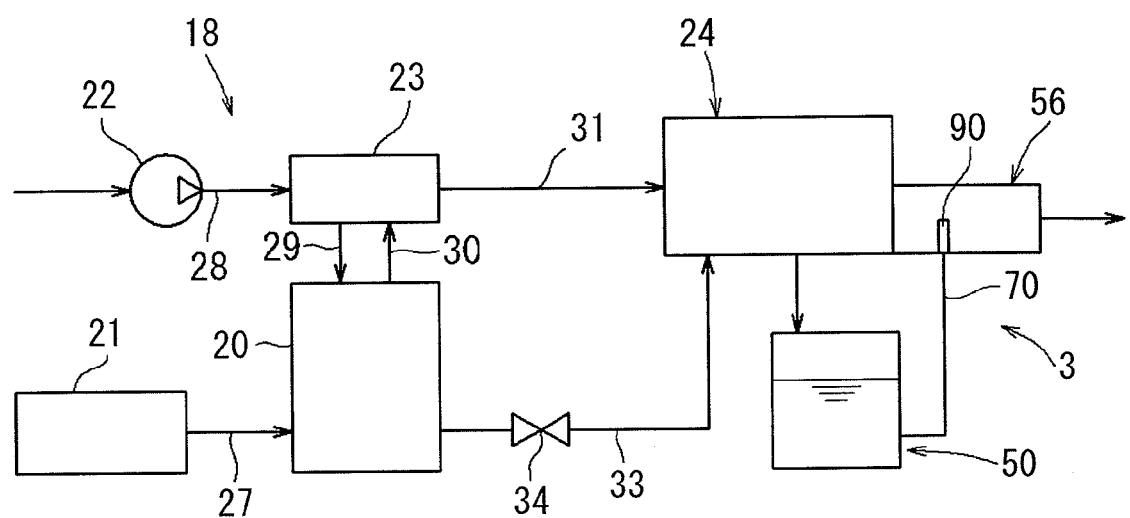
FIG. 25 is a schematic diagram of a fuel cell system according to the eighth embodiment.

As shown in FIGS. 25 and 26, the generated water discharge device 3 includes an inlet pipe 90 and a porous member 100. The inlet pipe 90 has a first part 91 extending from the tank 50 to the outlet pipe 56, and a second part 92 extending through the outlet pipe 56 from an outer circumferential surface to an inner circumferential surface at the venturi 56b. The second part 92 has a distal portion 93 located near the inner circumferential surface of the venturi 56b.

The porous member 100 is attached to the distal portion 93 of the second part 92 of the inlet pipe 90 as shown in FIG. 26 and protrudes into the outlet pipe 56. The porous member 100 is a porous metal sinter. The metal sinter is formed by molding metal powder under pressure and then performing a heat treatment at a temperature that is lower than or equal to the melting point to bond the powder particles. The porous member 100 includes a plurality of pores formed between powder particles so that water can be discharged out of the porous member 100 through the pores. The pore diameter is small and is, for example, 50 to 200 μm.

Figure 27:
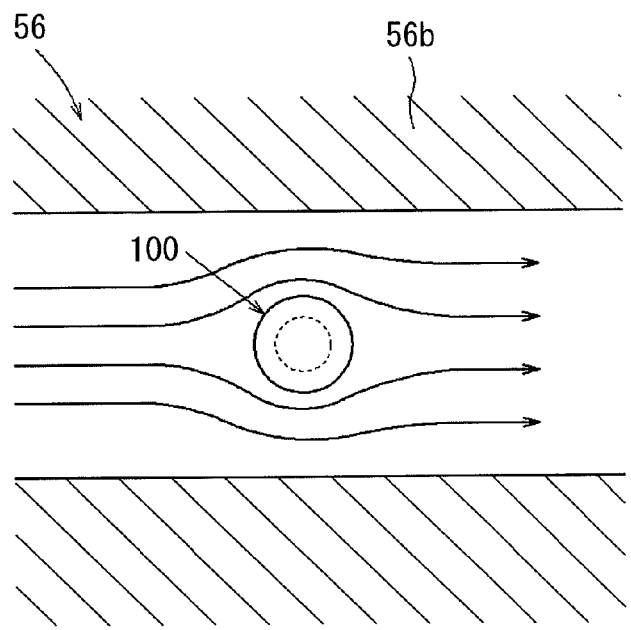
FIG. 27 is a schematic plan view showing the inner side of an outlet pipe and illustrating how gas flows around a porous member in the eighth embodiment.

Referring to FIGS. 26 and 27, the porous member 100, which is substantially cylindrical, includes a cylindrical side wall portion 101 and a lid portion 102, which closes an opening formed in the top of the side wall portion 101. The side wall portion 101 extends substantially perpendicular to the inner circumferential surface of the venturi 56b. The lid portion 102 is disk-shaped and located near the cross-sectional centerline 56g of the venturi 56b.

As shown in FIGS. 25 and 26, the exhaust from the fuel cell 20 increases the pressure in the tank 50, and pressure loss results in the pressure in the outlet pipe 56 being lower than the pressure in the tank 50. The pressure in the venturi 56b is lower than the pressure in the pipe entrance portion 56a due to the gas flowing through the outlet pipe 56. Thus, the pressure difference caused by the pressure loss or the pressure drop in the venturi 56b draws water from the tank 50 into the inlet pipe 90 and supplies the water to the porous member 100.

The water supplied to the porous member 100 passes through the pores and is discharged out of the porous member 100 to the outer surface of the porous member (see FIG. 26 and FIG. 27). The water discharged to the outer surface of the porous member 100 is carried away and atomized by the exhaust flowing in the outlet pipe 56. The flow velocity of the exhaust flowing in the outlet pipe 56 is the highest at or near the venturi 56b. This atomizes the water discharged to the outer surface of the porous member 100. Atomized water is discharged together with the exhaust from the outlet pipe 56 into the atmosphere and out of the forklift 10 (see FIG. 1).

As described above, the generated water discharge device 3 includes the outlet pipe 56 and the inlet pipe 90 as shown in FIG. 26. The porous member 100 including the pores through which water is discharged into the outlet pipe 56 is arranged on the distal portion 93 of the inlet pipe 90 near the venturi 56b.

Figure 28:
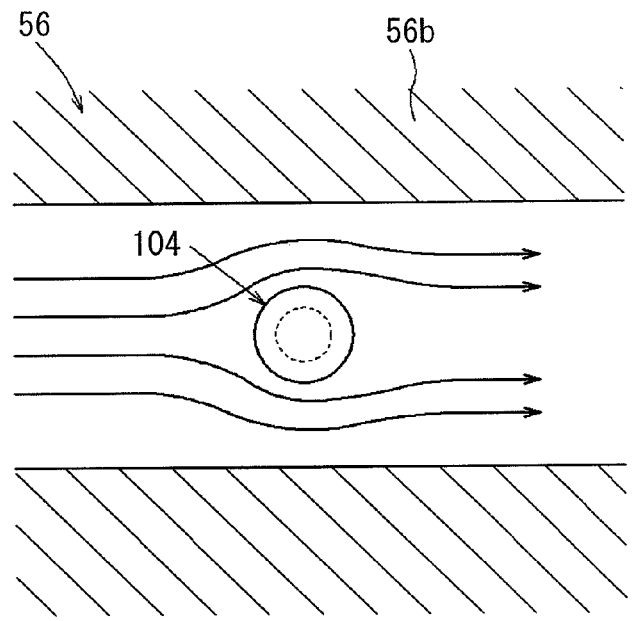
FIG. 28 is a schematic plan view showing the inner side of an outlet pipe and illustrating how gas flows around a metal pipe in a comparative example.

Accordingly, the water discharged to the outer surface of the porous member 100 is carried away and atomized by the gas flowing in the outlet pipe 56 at a flow velocity increased by the venturi 56b. The porous member 100, which includes the pores, has an unsmooth surface. This forms a turbulent boundary layer around the porous member 100. For example, referring to FIG. 28, when a pipe member 104 has a smooth outer circumferential surface, a laminar boundary layer is formed around the pipe member 104. In contrast, referring to FIG. 27, a turbulent boundary layer is formed around the porous member 100.

In the turbulent boundary layer, as compared to a laminar boundary layer, fluid molecules frequently and repeatedly collide against each other thereby resulting in a uniform flow velocity. Thus, the flow velocity is more uniform in a turbulent boundary layer formed by the porous member 100 then the laminar boundary layer. Further, a reversed flow and delamination are unlikely to occur. The intensity of noise (acoustic power) is generally proportional to the eighth power of the flow velocity of the gas flowing in the pipe. Thus, as long as the flow rate of the gas flowing in the outlet pipe is the same, the noise becomes smaller as the unevenness of the flow velocity decreases. Accordingly, the production of noise is suppressed due to the uniform flow velocity resulting from the turbulent boundary layer formed by the porous member 100 and the prevention of delamination.

The porous member 100 includes a plurality of pores. In comparison to a conventional nozzle that includes just one hole, it is less likely that the porous member 100 would be clogged thereby stopping the ejection of water. This improves the durability of the generated water discharge device 3.

Referring to FIG. 26, the porous member 100 is a metal sinter. In comparison to, for example, a punched metal having a plurality of punched out holes in a metal pipe or an expanded metal formed by expanding a metal pipe including a plurality of slits, the plurality of small holes are formed more easily. By decreasing the pore diameter, the droplet size of water discharged to the surface of the porous member 100 is decreased. This allows the water to be easily atomized. Further, the formation of many pores increases the pits and lands in the surface of the porous member 100 and facilitates the formation of the turbulent boundary layer. This has a strong effect for suppressing the production of noise.

As shown in FIG. 26, the distal portion 93 of the inlet pipe 90 is located near the inner circumferential surface of the outlet pipe 56. The porous member 100 protrudes from the distal portion 93 of the inlet pipe 90 into the outlet pipe 56. That is, the porous member 100 protrudes into the outlet pipe 56 instead of the inlet pipe 90. Thus, turbulent boundary layers are formed around substantially the entire porous member 100, which protrudes into the outlet pipe 56. This has a strong effect for suppressing the production of noise.

The eighth embodiment may be modified as described below.

Figure 29:
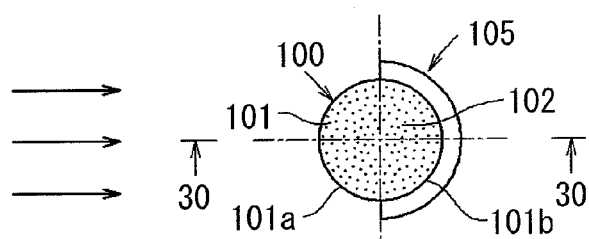
FIG. 29 is a plan view showing a porous member and a cover in a further example.
Figure 30:
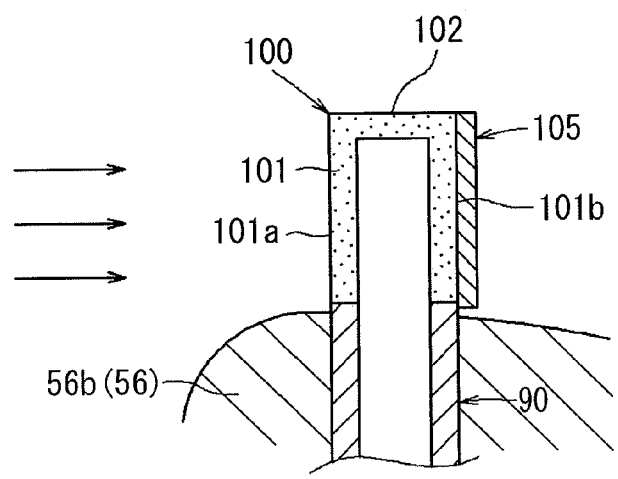
FIG. 30 is a cross-sectional view taken along line 30-30 in FIG. 29.

For example, a cover 105 shown in FIG. 29 and FIG. 30 may be arranged on the porous member 100. The cover 105 is formed from, for example, metal and partially covers the side wall portion 101 of the porous member 100 to hinder the discharge of water from the porous member 100.

As shown in FIGS. 29 and FIG. 30, the side wall portion 101 of the porous member 100 has an upstream region 101a facing the gas flowing through the outlet pipe 56 and an opposite downstream region 101b. The upstream region 101a and downstream region 101b are semi-circular. The cover 105 is shaped as a semi-circular arc to cover the downstream region 101b of the porous member 100 and extending from a basal end to a distal end of the downstream region 101b in the axial direction.

As the flow velocity of gas increases, more water discharged from the porous member 100 is atomized. The flow velocity of gas flowing around the porous member 100 is higher near the upstream region 101a than near the downstream region 101b. Thus, there is a possibility that water passes through the downstream region 101b of the porous member 100 without being atomized and being discharged into the outlet pipe 56 in a liquid state. In this respect, the cover 105 is arranged on the downstream region 101b of the porous member 100. Accordingly, water is prevented from being discharged into the outlet pipe 56 from the downstream region 101b in a liquid state.

Figure 31:
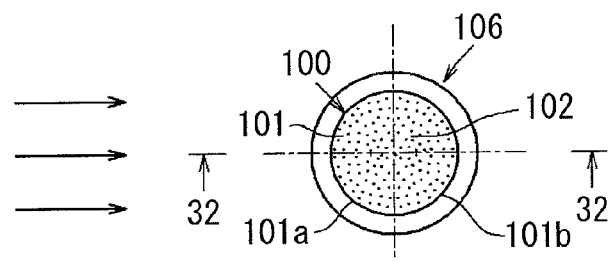
FIG. 31 is a plan view showing a porous member and a cover in a further example.
Figure 32:
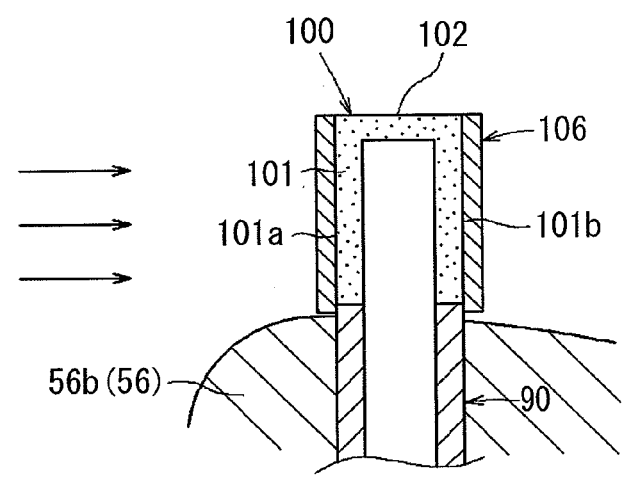
FIG. 32 is a cross-sectional view taken along line 32-32 in FIG. 31.

The cover 105 is arranged on the porous member 100 shown in FIGS. 29 and 30. Instead, a cover 106 shown in FIGS. 31 and 32 may be arranged on the porous member 100. As shown in FIGS. 31 and 32, the cover 106 is cylindrical and covers the entire circumference of the side wall portion 101 of the porous member 100, and extends from a basal end to a distal end of the side wall portion 101 in the axial direction. Accordingly, the cover 106 covers the upstream region 101a and downstream region 101b of the side wall portion 101 so that water is discharged into the outlet pipe 56 from the lid portion 102 of the porous member 100.

Figure 33:
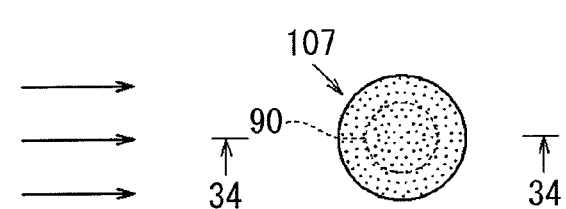
FIG. 33 is a plan view showing a porous member and an inlet pipe in a further example.
Figure 34:
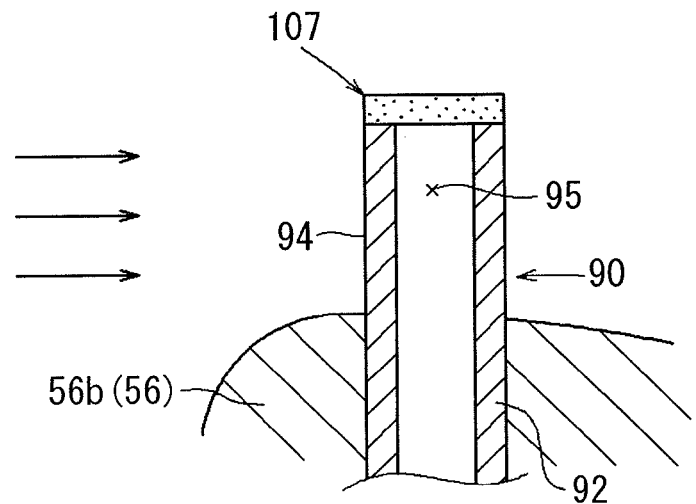
FIG. 34 is a cross-sectional view taken along line 34-34 in FIG. 33.

The generated water discharge device 3 shown in FIG. 26 includes the inlet pipe 90 and the porous member 100. However, the generated water discharge device 3 may have an inlet pipe 90 and a porous member 107, which are shown in FIGS. 33 and 34. As shown in FIG. 34, the inlet pipe 90 has a second part 92, which extends through the venturi 56b from an outer circumferential surface to an inner circumferential surface, and a third part 94, which protrudes from the second part 92 into the venturi 56b. The third part 94 extends from the inner circumferential surface of the venturi 56b to near the cross-sectional centerline of the venturi 56b. A disk-like porous member 107 is arranged on the distal end 95 of the third part 94 to cover the opening of the distal end 95. Therefore, water that passes through the inlet pipe 90 is discharged into the outlet pipe 56 from the porous member 107.

Figure 35:
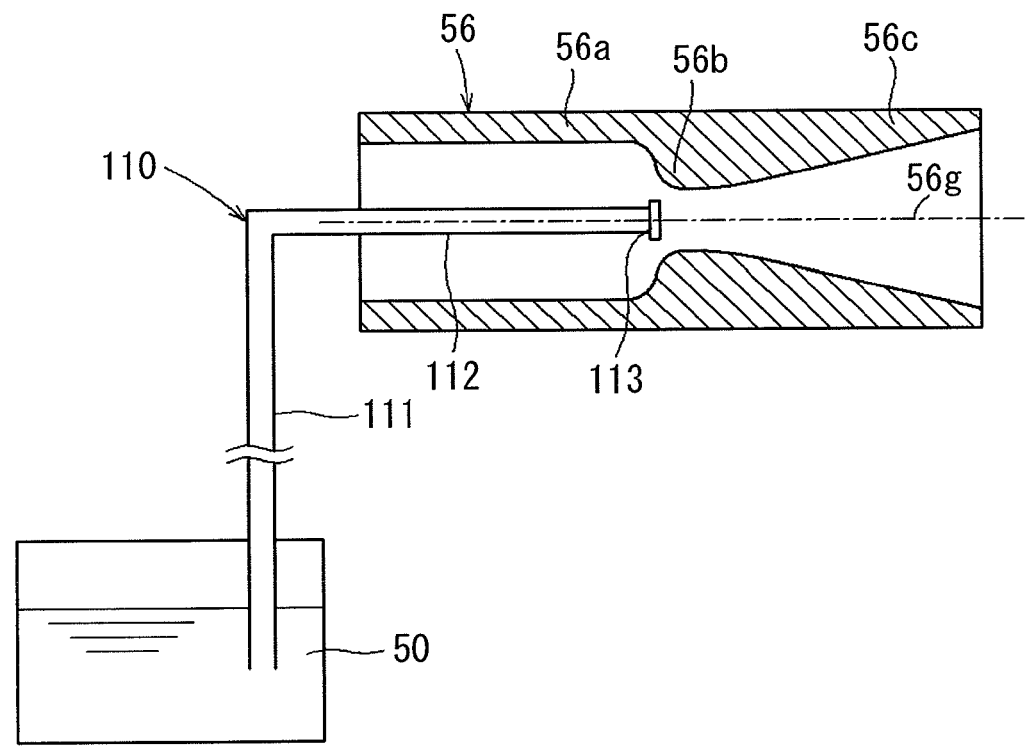
FIG. 35 is a schematic diagram of a generated water discharge device in a further example.

The generated water discharge device 3 shown in FIG. 26 includes the inlet pipe 90 and the porous member 100. However, the generated water discharge device 3 may have an inlet pipe 110 and a porous member 113, which are shown in FIG. 35. The inlet pipe 110 has a first part 111, which extends from the tank 50 to the outlet pipe 56, and a second part 112, which extends into the outlet pipe 56. The first part 111 has a bottom end located below the surface of the water contained in the tank 50. The second part 112 extends from an end of the pipe entrance portion 56a in the outlet pipe 56 toward the venturi 56b. The second part 112 has a distal portion located near the venturi 56b. The porous member 113, which is similar to the porous member 100 shown in FIG. 26, is arranged on the distal portion of the second part 112.

The porous member 100 shown in FIG. 26 is a metal sinter but may be formed from a punched metal or expanded metal. Punched metal is formed by punching out a plurality of holes from a metal pipe. Expanded metal is formed by forming a plurality of slits in a metal pipe and expanding the metal pipe to enlarge the slits and obtain a plurality of holes.

The distal portion 93 of the inlet pipe 90 shown in FIG. 26 is arranged near the inner circumferential surface of the outlet pipe 56, and the porous member 100 is attached to the distal portion 93. Instead, the distal end of an inlet pipe may protrude into the outlet pipe 56. In this case, an opening may be formed in a side surface of part of the distal portion, and a porous member may be arranged in the opening. The outlet pipe 56 shown in FIGS. 25 and 26 is connected to an exhaust side of the fuel cell 20. However, the outlet pipe 56 may be connected to a compressor or the like, so the compressor or the like supplies gas to the outlet pipe 56.

Figure 36:
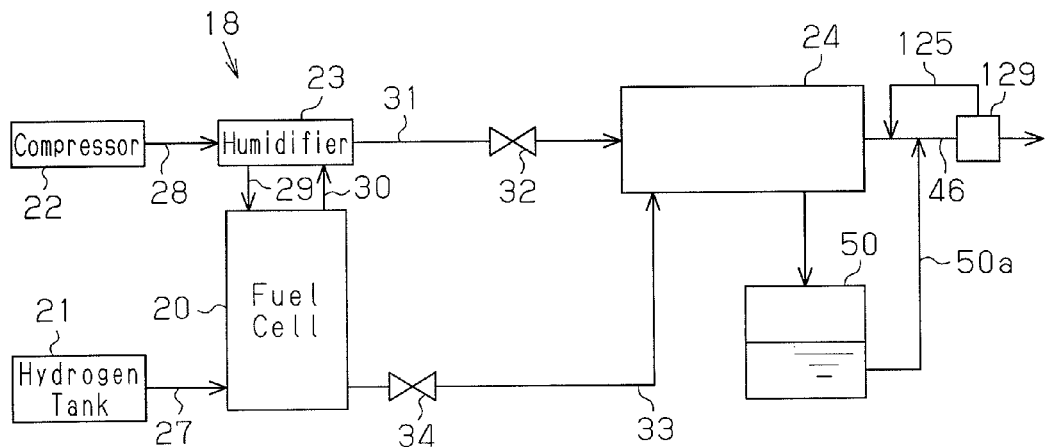
FIG. 36 is a schematic diagram of a fuel cell system according to the ninth embodiment.
Figure 37:
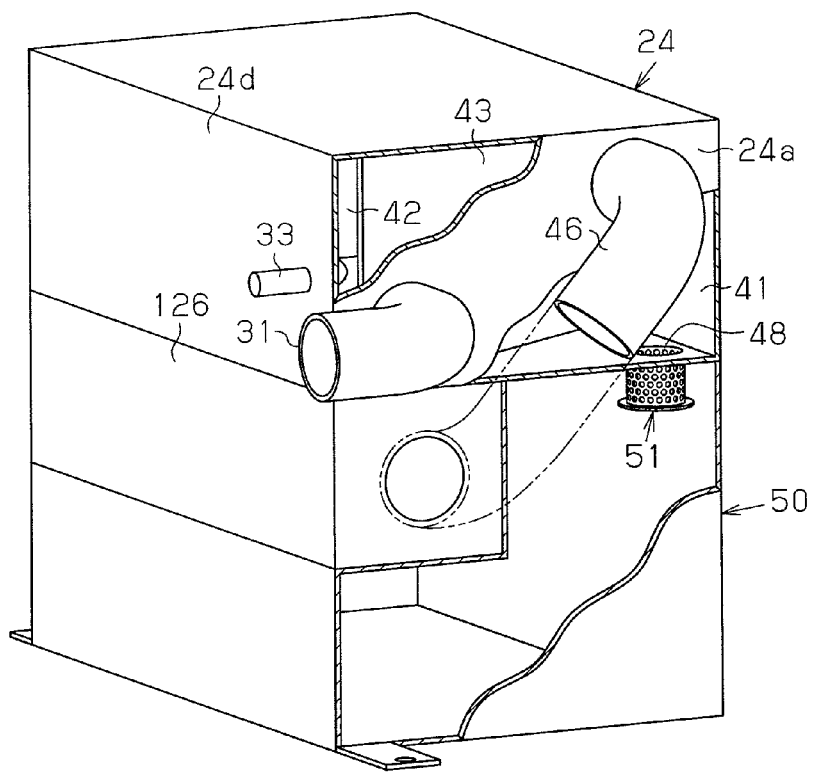
FIG. 37 is a schematic perspective view showing a gas-liquid separator and a tank in the ninth embodiment.

A ninth embodiment of the present invention will now be discussed with reference to FIGS. 36 to 38.

As shown in FIG. 38, the outlet pipe 46 includes a metal pipe 127 and a flow path formation block 126. The metal pipe 127 is formed on upstream side of the outlet pipe 46, or the side of the outlet pipe 46 closer to the gas-liquid separator 24. The flow path formation block 126 is cylindrical, formed from resin material, and arranged downstream of the metal pipe 127. The flow path formation block 126 has a first end defining an inlet port 126a connected to the metal pipe 127. Further, the flow path formation block 126 has a second end defining an exit 126e.

In the flow path formation block 126, a venturi 122 is formed at the side closer to the gas-liquid separator 24, and an expansion chamber 129 is formed downstream of the venturi 122. The venturi 122 has a small-diameter portion 123, which is a constricted part of the outlet pipe 46 where the flow path diameter is the smallest. The venturi 122 also has first and second diameter increasing portions 124a and 124b, the diameters of which respectively increase from the small-diameter portion 123 toward the gas-liquid separator 24 and toward the expansion chamber 129.

The tank 50 is connected to a basal end of an inlet pipe 50a, which draws water from the tank 50 into the outlet pipe 46. The inlet pipe 50a has a distal end provided with an inlet nozzle 50c, which extends through the flow path formation block 126 and protrudes into the small-diameter portion 123 of the venturi 122. Thus, the interior of the venturi 122 is in communication with the tank 50 through the inlet pipe 50a and the inlet nozzle 50c.

The expansion chamber 129 has a diameter increasing portion 129a, the diameter of which is increased to be greater than that of the second diameter increasing portion 124b, and a constant diameter portion 129b, which extends from the diameter increasing portion 129a where the diameter is the largest in the axial direction of the outlet pipe 46. In the expansion chamber 129, a water drain hole 129c is formed at a location corresponding to the constant diameter portion 129b. The water drain hole 129c is connected to a basal end of a return pipe 125. The return pipe 125 has a distal end provided with a return nozzle 125a, which extends through the flow path formation block 126 and protrudes into the small-diameter portion 123 of the venturi 122. The return nozzle 125a is arranged upstream of the inlet nozzle 50c in the small-diameter portion 123. Thus, the interior of the venturi 122 and the expansion chamber 129 are communication with each other through the return pipe 125 and the return nozzle 125a.

A collar 128, which is a tubular member, is arranged in the exit 126e. The collar 128 is formed from a metal material. The collar 128 has an upstream end located upstream relative to the flow direction of gas and a downstream end located opposite to the upstream end. A first end of the collar 128 protrudes from the exit 126e into the expansion chamber 129 to form a gap between an outer circumferential surface of the first end of the collar 128 and an inner circumferential surface of the expansion chamber 129. A second end of the collar 128 is in contact with the entire inner circumferential surface of the exit 126e. This seals the space between the outer circumferential surface of the second end of the collar 128 and the exit 126e.

Next, the operation of the fuel cell system 18 according to the ninth embodiment will be described.

The venturi 122 is formed in the outlet pipe 46. Thus, in the outlet pipe 46, the pressure in the small-diameter portion 123 is lower than the pressures in the first and second diameter increasing portions 124a and 124b. This suddenly increases the flow velocity of the gas mixture flowing from the first chamber 41 of the gas-liquid separator 24 to the outlet pipe 46 when passing through the small-diameter portion 123. Further, the pressure in the small-diameter portion 123 is also lower than the pressure in the tank 50. This results in the venturi effect drawing water from the tank 50 via the inlet pipe 50a and through the inlet nozzle 50c into the small-diameter portion 123. The water drawn into the small-diameter portion 123 is atomized into atomized water by the gas mixture flowing at a suddenly increased flow velocity. The atomized water then flows into the expansion chamber 129 together with the gas mixture.

Some of the gas mixture passing through the venturi 122 strikes the inlet nozzle 50c and the return nozzle 125a. Thus, the flow of the gas mixture becomes uneven and produces differences in the flow velocity at the downstream side of the small-diameter portion 123 of the outlet pipe 46. However, since the gas mixture flows into the expansion chamber 129, the flow is adjusted in the expansion chamber 129 to be uniform and reduce the differences in the flow velocity.

Some of the atomized water flowing into the expansion chamber 129 collects on the inner circumferential surface of the expansion chamber 129 and returns to water droplets. When the water droplets collected on the inner circumferential surface of the expansion chamber 129 reach the collar 128, the flow of the gas mixture blows the water droplets toward the gap between the outer circumferential surface of the collar 128 and the inner circumferential surface of the expansion chamber 129. Thus, water is collected in the gap. As a result, water is prevented from being discharged out of the exit 126e together with the gas mixture.

Further, the pressure in the expansion chamber 129 is lower than the pressure in the small-diameter portion 123 of the venturi 122. Thus, the water collected in the expansion chamber 129 is returned to the venturi 122 through the return pipe 125. The water is then atomized again into atomized water by the gas mixture. As a result, water that becomes water droplets in the expansion chamber 129 is not released out of the exit 126e, and the water is atomized and discharged into the atmosphere from the exit 126e of the expansion chamber 129.

The following advantages are achieved by the ninth embodiment:

(11) The outlet pipe 46 includes the venturi 122. Thus, water is drawn from the tank 50 into the venturi 122 through the inlet nozzle 50c and atomized into atomized water. Further, the expansion chamber 129 is located downstream of the venturi 122 in the outlet pipe 46. Thus, even when the gas mixture strikes the inlet nozzle 50c and produces differences in the flow velocity of the gas mixture discharged from the gas-liquid separator 24, the flow of gas mixture is adjusted in the expansion chamber 129 so that the flow becomes uniform and differences in the flow velocity are reduced. This reduces noise produced by differences in the flow velocity. Further, some of the atomized water atomized in the venturi 122 collects on the inner circumferential surface of the expansion chamber 129 and returns to water droplets and falls. The fallen water droplets reach the collar 128, which prevent the water from being released from the exit 126e together with the gas mixture flowing through the expansion chamber 129. The water droplets that have fallen onto the collar 128 move along the outer circumferential surface of the collar 128 and are collected in the expansion chamber 129. The water collected in the expansion chamber 129 is returned to the venturi 122 through the return pipe 125 and then atomized again into atomized water. Thus, noise is reduced without affecting the water atomizing function, and the forklift 10 is prevented from dripping water and wetting the floor when the forklift 10 uses the fuel cell 20 as the power source to travel or work indoors.

(12) In the small-diameter portion 123 of the venturi 122, the return nozzle 125a is arranged upstream relative to the inlet nozzle 50c. Thus, water that has been drawn from the inlet nozzle 50c into the venturi 122 and atomized does not strike the return nozzle 125a and return to water droplets. Some of the water that has been returned into the venturi 122 from the return nozzle 125a and atomized strikes the inlet nozzle 50c and returns to water droplets. However, the amount of water returned into the venturi 122 from the return nozzle 125a is less than the amount of water drawn from the inlet nozzle 50c into the venturi 122. Thus, the amount of water that returns to water droplets in the venturi 122 is decreased. This decreases the amount of water collected in the expansion chamber 129 and reduces the space in the expansion chamber 129 used to collect water.

(13) The expansion chamber 129 is in communication with the interior of the venturi 122 through the return pipe 125 and the return nozzle 125a. Thus, the difference between the pressure in the expansion chamber 129 and the pressure in the venturi 122 returns the water collected in the expansion chamber 129 to the venturi 122. Accordingly, compared to when using a separate pump to return the collected in the expansion chamber 129 to the venturi 122, the structure of the fuel cell system 18 is simplified.

(14) The expansion chamber 129 has two functions, a function for reducing noise and a function for collecting water that has returned to water droplets in the expansion chamber 129. Thus, compared to when a water collection portion is provided in addition to the expansion chamber 129 to collect water that has returned to water droplets in the expansion chamber 129, the structure of the fuel cell system 18 is more compact.

(15) Advantages (2) and (3) of the first embodiment are obtained.

(16) The flow path formation block 126 is formed from a resin material. Thus, compared to when the flow path formation block 126 is formed from, for example, a metal material, corrosion of the flow path formation block 126 caused by water is prevented.

(17) The entire outer circumferential surface of the second end of the collar 128 is in contact with the entire inner circumferential surface of the exit 126e. This seals the space between the outer circumferential surface of the second end of the collar 128 and the exit 126e. Thus, water collected on the inner circumferential surface of the expansion chamber 129 and returned to water droplets is prevented from leaking out of the space between the outer circumferential surface of the collar 128 and the exit 126e.

The ninth embodiment may be modified as described below.

In the ninth embodiment, in the small-diameter portion 123 of the venturi 122, the return nozzle 125a is arranged upstream relative to the inlet nozzle 50c but is not limited to such an arrangement. The return nozzle 125a may be arranged at a position facing toward the inlet nozzle 50c or a position downstream of the inlet nozzle 50c in the small-diameter portion 123 of the venturi 122.

In the ninth embodiment, the flow path formation block 126 is formed of a resin material but is not limited to such a material. Any material may be used to form the flow path formation block 126 as long as it resists corrosion caused by water.

In the ninth embodiment, the collar 128 is cylindrical but is not limited to such a shape. For example, the collar 128 may be a tetragonal tube. As long as the outer contour of the collar 128 conforms to the shape of the exit 126e, the collar 128 may have any shape.

In the ninth embodiment, the entire outer circumferential surface of the second end of the collar 128 is in contact with the entire inner circumferential surface of the exit 126e but is not limited to such a structure. The outer circumferential surface of the second end of the collar 128 may partially not be in contact with the inner circumferential surface of the exit 126e. In other words, the outer contour of the collar 128 does not necessarily have to conform to the shape of the exit 126e.

In the ninth embodiment, the collar 128 is formed from a metal material but is not limited to such a material. For example, the collar 128 may be formed from a resin material. The material of the collar 128 is not particularly limited.

The first to ninth embodiments may be modified as described below.

The dilution function may be eliminated from the gas-liquid separator 24. Instead, for example, a separate attenuator that dilutes the hydrogen concentration of the anode off-gas may be arranged in the purge gas pipe 33.

The present invention is applied to the forklift 10, which is an indoor industrial vehicle, but is not limited to such an application. For example, the invention may be applied to a towing vehicle or a hand lifter (apparatus pushed by an operator for movement and including a lifter to lift and lower loads) or the like as an indoor industrial vehicle.

The forklift 10 does not necessarily have to be used indoors and may be a forklift operated outdoors. The present invention may also be applied to outdoor-operating industrial vehicles other than forklifts.

The present invention is not limited to industrial vehicles and may be applied to other vehicles.

The present invention is not limited to a movable object such as a vehicle and may be applied to an electrical product that requires a power source or to a stationary fuel cell system.

What is claimed is:

1. A fuel cell system comprising:
    a fuel cell;
    a gas-liquid separator that separates off-gas, which is discharged from the fuel cell, into liquid water and gas;
    a tank capable of containing the liquid water separated by the gas-liquid separator;
    an outlet pipe that discharges the gas separated by the gas-liquid separator out of the gas-liquid separator, the outlet pipe including a venturi having a small-diameter portion which is a constricted region in the outlet pipe and a diameter increasing portion, the small-diameter portion having a through hole that extends from an outer peripheral surface of the small-diameter portion to an inner peripheral surface of the small-diameter portion; and
    an inlet pipe extending from the tank to the venturi;
    wherein the liquid water contained in the tank is drawn through the inlet pipe and the through hole into the venturi to be atomized by a venturi effect and discharged as atomized water from the outlet pipe.

2. The fuel cell system according to claim 1, wherein the outlet pipe has an outlet port arranged near a heat source that vaporizes the atomized water.

3. The fuel cell system according to claim 2, wherein the atomized water discharged from the outlet pipe is discharged toward an upstream side of the heat source in a flow direction of current directed toward the heat source.

4. The fuel cell system according to claim 1, further comprising:
    a nozzle that is arranged to be movable relative to the venturi and discharges the water in the inlet pipe into the outlet pipe;
    a moving device that moves the nozzle between an operating position, in which an end portion of the nozzle is located near a cross-sectional centerline of the venturi, and a retracted position, in which the nozzle is protruded from an inner circumferential surface of the venturi by an amount less than that when in the operating position; and
    a control unit that controls the moving device;
    wherein the control unit moves the nozzle to the operating position when a drive device, which is driven by power from the fuel cell, is supplied with power that is greater than or equal to a predetermined value, and the control unit moves the nozzle to the retracted position when the drive device is supplied with power that is less than the predetermined level.

5. The fuel cell system according to claim 4, wherein the fuel cell system is installed in an industrial vehicle including a load handling device;
    the drive device includes a vehicle drive motor and a load handling drive device, which drives the load handling device; and
    the control unit moves the nozzle to the operating position when at least one of the vehicle drive motor and the load handling drive device is supplied with power that is greater than or equal to the predetermined value, and the control unit moves the nozzle to the retracted position when the vehicle drive motor and the load handling drive device are both supplied with power that is less than the predetermined level.

6. The fuel cell system according to claim 4, further comprising:
    a valve arranged in the inlet pipe;
    wherein the control unit controls an open degree of the valve in accordance with an exhaust amount of the fuel cell to adjust an amount of the water discharged from the nozzle into the outlet pipe.

7. The fuel cell system according to claim 1, wherein the inlet pipe includes;
    a first pipe member extending from the tank toward the outlet pipe;
    a second pipe member extending from the first pipe member into the outlet pipe and having a side wall portion provided with a water supply port; and
    a water deflection member extending from the second pipe member in a radial direction of the outlet pipe and arranged in the outlet pipe in or near the venturi; and
    water supplied to an outer circumferential surface of the second pipe member through the water supply port moves to an end portion of the water deflection member and is atomized at the end portion of the water deflection member by gas flowing in the outlet pipe.

8. The fuel cell system according to claim 7, wherein the water deflection member is arranged on a distal portion of the second pipe member to close the distal portion and extend in the radial direction entirely from a circumference of the distal portion.

9. The fuel cell system according to claim 7, wherein the gas-liquid separator is formed to mix exhaust from an anode side of the fuel cell with exhaust from a cathode side of the fuel cell, the outlet pipe being connected to an outlet port of the gas-liquid separator; and
    the first pipe member extends from the tank toward the outlet pipe in the gas-liquid separator or in contact with a wall surface of the gas-liquid separator.

10. The fuel cell system according to claim 9, wherein the first pipe member is held in the gas-liquid separator by a bracket, which is attached to the gas-liquid separator, at a position spaced apart by a predetermined distance from an inner wall surface of the gas-liquid separator.

11. The fuel cell system according to claim 7, wherein the second pipe member extends substantially parallel to the flow of gas in the outlet pipe and substantially along a cross-sectional center of the venturi in the outlet pipe.

12. The fuel cell system according to claim 1, wherein the inlet pipe has a distal portion located in the outlet pipe in or near the venturi inside, and a porous member that is capable of discharging water into the outlet pipe is arranged on the distal portion.

13. The fuel cell system according to claim 12, wherein the porous member is a metal sinter.

14. The fuel cell system according to claim 12, wherein the distal portion of the inlet pipe is located near an inner circumferential surface of the outlet pipe, and the porous member protrudes into the outlet pipe from the distal portion of the inlet pipe.

15. The fuel cell system according to claim 12, wherein the porous member includes an upstream region, which faces toward a flow of gas in the outlet pipe, and a downstream region opposite to the upstream region, and wherein a cover that covers the downstream region is arranged on the porous member.

16. The fuel cell system according to claim 1, further comprising:
    an inlet nozzle arranged in the inlet pipe so as to protrude into the venturi, the inlet nozzle drawing the water contained in the tank into the venturi;
    an expansion chamber arranged downstream of the venturi in the outlet pipe to form water droplets from some of the atomized water, which has been drawn into and atomized by the venturi, and collect the water droplets;
    a return pipe that returns water collected in the expansion chamber to the venturi; and
    a tubular member arranged at an exit of the expansion chamber so as to protrude into the expansion chamber.

17. The fuel cell system according to claim 16, wherein a return nozzle protruding into the venturi is arranged on a distal end of the return pipe; and the return nozzle is arranged upstream of the inlet nozzle in the venturi.

18. The fuel cell system according to claim 16, wherein the outlet pipe includes a flow path formation block that forms part of the outlet pipe, the venturi, and the expansion chamber, the flow path formation block being formed from a resin material.

19. The fuel cell system according to claim 16, wherein an entire outer surface of a downstream portion of the tubular member is in contact with an entire inner surface of the exit of the expansion chamber.

20. The fuel cell system according to claim 1, wherein the fuel cell system is installed in an indoor industrial vehicle.

21. The fuel cell system according to claim 1, further comprising:
    a hydrogen pipe that draws anode off-gas from the fuel cell into the gas-liquid separator;
    wherein the gas-liquid separator has a dilution function for diluting hydrogen, which is contained in the anode off-gas.

22. The fuel cell system according to claim 1, further comprising:
    a pressure regulation valve arranged in the outlet pipe to adjust pressure of air in the fuel cell;
    wherein the inlet pipe draws the water contained in the tank into an inlet portion located downstream of the pressure regulation valve in the outlet pipe;
    wherein the pressure regulation valve is configured to adjust the pressure of air in the outlet pipe located downstream of the pressure regulation valve to be lower than pressure of air in the fuel cell, the gas-liquid separator and the tank located upstream of the pressure regulation valve to draw the water contained in the tank through the inlet pipe into an inlet portion located downstream of the pressure regulation valve in the outlet pipe in which the water is atomized into atomized water and discharged from the outlet pipe.

23. The fuel cell system according to claim 22, further comprising:
    a hydrogen pipe that draws anode off-gas from the fuel cell into the gas-liquid separator;
    wherein the gas-liquid separator has a dilution function for diluting hydrogen, which is contained in the anode off-gas.

24. The fuel cell system according to claim 22, wherein the pressure regulation valve is a butterfly valve moved between a valve-open position, which increases a flow path cross-sectional area of the outlet pipe, and a valve-closed position, which decreases the flow path cross-sectional area of the outlet pipe;
    wherein the inlet portion is arranged in the outlet pipe at a position facing toward a distal portion of the butterfly valve arranged in the valve-closed position.

* * * * *

UNITED STATES PATENT AND TRADEMARK OFFICE
CERTIFICATE OF CORRECTION

PATENT NO. : 8,697,305 B2
APPLICATION NO. : 12/723470
DATED : April 15, 2014
INVENTOR(S) : Akio Matsuura, Toru Bisaka and Yusuke Shimoyana Page 1 of 1

It is certified that error appears in the above-identified patent and that said Letters Patent is hereby corrected as shown below:

On the title page, item (73) Assignee:

~~Kabushiki Kaisha Toyoda Jidoshokki~~, Aichi-ken (JP)

should read as follows:

Kabushiki Kaisha Toyota Jidoshokki

Signed and Sealed this
Eighth Day of July, 2014

Michelle K. Lee
*Deputy Director of the United States Patent and Trademark Office*